(12) United States Patent
Hu et al.

(10) Patent No.: US 10,723,652 B2
(45) Date of Patent: Jul. 28, 2020

(54) TEMPERED AND COLORLESS ANTIMICROBIAL SODA LIME GLASS AND METHODS OF MAKING AND USING SAME

(71) Applicant: CORNING INCORPORATED, Corning, NY (US)

(72) Inventors: Hongmei Hu, Painted Post, NY (US); Jennifer Lynn Hunt, Corning, NY (US); Sumalee Likitvanichkul, Painted Post, NY (US); Ananthanarayanan Subramanian, Corning, NY (US); Li Yao, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 528 days.

(21) Appl. No.: 15/324,173

(22) PCT Filed: Jul. 6, 2015

(86) PCT No.: PCT/US2015/039190
§ 371 (c)(1),
(2) Date: Jan. 5, 2017

(87) PCT Pub. No.: WO2016/007408
PCT Pub. Date: Jan. 14, 2016

(65) Prior Publication Data
US 2017/0204005 A1    Jul. 20, 2017

Related U.S. Application Data

(60) Provisional application No. 62/057,631, filed on Sep. 30, 2014, provisional application No. 62/021,456, filed on Jul. 7, 2014.

(51) Int. Cl.
*C03C 21/00*    (2006.01)
*C03C 15/00*    (2006.01)
(Continued)

(52) U.S. Cl.
CPC ............ *C03C 21/005* (2013.01); *A01N 25/08* (2013.01); *A01N 59/16* (2013.01); *C03C 3/04* (2013.01);
(Continued)

(58) Field of Classification Search
None
See application file for complete search history.

(56) References Cited

U.S. PATENT DOCUMENTS 3,284,181 A    11/1966    Harrell et al.
9,567,259 B2    2/2017    Amin et al.
(Continued)

FOREIGN PATENT DOCUMENTS

JP    2000053451    2/2000
JP    2010138025 A    6/2010
(Continued)

OTHER PUBLICATIONS

English Translation of CN201580047905.7 Office Action dated Jan. 18, 2019; 15 pages; Chinese Patent Office.
(Continued)

*Primary Examiner* — David Sample
(74) *Attorney, Agent, or Firm* — Kevin M. Johnson

(57) ABSTRACT

Described herein are various antimicrobial soda lime glass articles that have improved resistance to discoloration when exposed to harsh conditions, including manufacturing conditions. The improved antimicrobial glass articles described herein generally include a SLG substrate that has a thickness, t; a compressive stress layer of about 0.15*t or greater; and an antimicrobial agent-containing region having an antimicrobial agent and a thickness less than the thickness of the compressive stress layer. Roughly 2 to 20 microns of the primary surfaces of the glass substrate can be removed prior to development of the compressive stress and antimicrobial
(Continued)

agent-containing region. In some aspects, prior-annealed and tempered, or prior-annealed, SLG is employed as the substrate. In some aspects, the substrate includes tin at one surface. The improved SLG substrates experience substantially no discoloration when exposed to harsh conditions. Methods of making and using the glass articles are also described.

30 Claims, 18 Drawing Sheets

(51) Int. Cl.

| | | |
|---|---|---|
| *C03C 3/087* | (2006.01) | |
| *A01N 25/08* | (2006.01) | |
| *A01N 59/16* | (2006.01) | |
| *C03C 3/04* | (2006.01) | |
| *C03C 4/18* | (2006.01) | |

(52) U.S. Cl.
CPC ............. *C03C 3/087* (2013.01); *C03C 4/18* (2013.01); *C03C 15/00* (2013.01); *C03C 21/002* (2013.01); *C03C 2204/02* (2013.01); *C03C 2218/31* (2013.01)

(56) References Cited

U.S. PATENT DOCUMENTS

| | | | |
|---|---|---|---|
| 9,609,873 | B2 | 4/2017 | Borrelli et al. |
| 9,758,428 | B1* | 9/2017 | Zhang ................. C03C 21/005 |
| 2008/0063728 | A1 | 3/2008 | Fechner et al. |
| 2012/0034435 | A1* | 2/2012 | Borrelli ................. C03C 17/30 |
| | | | 428/210 |
| 2012/0219792 | A1 | 8/2012 | Yamamoto et al. |
| 2013/0045375 | A1 | 2/2013 | Gross |
| 2013/0224492 | A1* | 8/2013 | Bookbinder .......... C03C 23/007 |
| | | | 428/410 |
| 2014/0017462 | A1 | 1/2014 | Borrelli et al. |
| 2014/0308512 | A1 | 10/2014 | Yamamoto et al. |
| 2015/0147775 | A1 | 5/2015 | Fiacco et al. |

FOREIGN PATENT DOCUMENTS

| | | |
|---|---|---|
| JP | 2011057547 A | 3/2011 |
| JP | 2012079133 A | 4/2012 |
| KR | 2012117495 A | 10/2012 |
| WO | 2011145592 | 11/2011 |
| WO | 2013038705 | 3/2013 |

OTHER PUBLICATIONS

International Search Report and Written Opinion of the International Searching Authority; PCT/US2015/039190; dated Oct. 9, 2015.
ASTM C-1499-03, "Standard Test Method for Monotonic Equibiaxial Flexural Strength of Advanced Ceramics at Ambient Temperature", ASTM Int'l, Apr. 10, 2003.
ASTM procedure D1003, "Standard Test Method for Haze and Luminous Transmittance of Transparent Plastics", ASTM Int'l, Nov. 15, 2013.
JIS Z 2801 (2000), "Antimicrobial Products-Test for Antimicrobial Activity and Efficacy.", First English edition published Aug. 2001.
Japanese Patent Application No. 2017501190; English Translation of the Office Action dated Jul. 3, 2019; Japan Patent Office, 10 Pgs.
Wang, "Thermal stability of silver in ion exchanged soda lime glasses" Journal of Vacuum Science & Technology A, 14, pp. 465-470 (1996).
Karlsson, "Modification of float glass surfaces by ion exchange" Linnnaeus University Dissertations, No. 89. 176 pgs. (2012).
Ahmed and Abdallah, "Effect of ion exchange and heat treatment conditions on the diffusion of silver into a soda-lime-silica-glass," Physics and Chemistry of Glasses, 38: pp. 42-50 (1997).
Zhengshu Chen et al, "Float Glass, Edition 1," p. 100-101, Wuhan University of Technology Press, Aug. 1997.
Ya Chen, "Modern Practical Plating Technology, Edition 1," p. 318, National Defense Industry Press, Jan. 2003.
Chinese Patent Application No. 201580047905.7; English Translation of the Second Office Action dated Nov. 29, 2019; China Patent Office; 14 Pgs.

* cited by examiner

TEMPERED AND COLORLESS ANTIMICROBIAL SODA LIME GLASS AND METHODS OF MAKING AND USING SAME

CROSS-REFERENCE TO RELATED APPLICATIONS

This application claims the benefit of priority under 35 U.S.C. § 119 of U.S. Provisional Application Ser. No. 62/057,631 filed on Sep. 30, 2014 and U.S. Provisional Application Ser. No. 62/021,456 filed on Jul. 7, 2014, the content of which are relied upon and incorporated herein by reference in its entirety.

TECHNICAL FIELD

The present disclosure relates generally to antimicrobial soda lime glass articles. More particularly, the various embodiments described herein relate to soda lime glass articles having antimicrobial behavior, such that the glass articles exhibit reduced discoloration when exposed to harsh conditions (e.g., manufacturing conditions, elevated temperatures, humidity, oxidizing environments, reducing environments, and/or the like) while maintaining antimicrobial efficacy, as well as to methods of making and using the glass articles.

BACKGROUND

Devices and applications that require high optical transmission, low haze, and high durability, among other features are becoming more prevalent. As the extent to which such devices and applications include surfaces that come into contact with food and other consumables, or include interactions between a user or multiple users and the device, the likelihood of the surface harboring microorganisms (e.g., bacteria, fungi, viruses, and the like) that can be transferred from user to user increases.

Surfaces requiring high optical clarity that can harbor microorganisms are employed in appliance applications (e.g., shelving, doors and other components), architectural applications (e.g., walls, elevators, counter tops, shower stalls, etc.) and other electronic devices with displays and surfaces subject to user touch interactions. Soda lime glass (SLG) can be employed these applications due to its relatively low cost compared to other materials.

To minimize the presence of microbes on SLG, so-called "antimicrobial" properties have been imparted to a variety of glass articles. Such antimicrobial (AM) SLG articles, regardless of whether they are used as screen surfaces of touch-activated devices, in appliances, architectural applications or in other applications, have a propensity to discolor when exposed to elevated temperatures, humidity, reactive environments, and/or the like. These harsh conditions can occur during fabrication or processing of the SLG articles, or during ordinary use of the articles. In certain cases, this discoloration can render an SLG article unsightly. Further, excessive discoloration ultimately can lead to the glass article becoming unsuitable for its intended purpose. There are times when the coloration is desirable and becomes a feature. However, in these cases control of the color is necessary.

There accordingly remains a need for technologies that provide antimicrobial SLG articles with improved resistance against discoloration when exposed to harsh conditions, including the conditions associated with manufacturing the articles. It would be particularly advantageous if these technologies did not adversely affect other desirable properties of the surfaces (e.g., optical transmission, haze, strength, scratch resistance, and the like). It is to the provision of such technologies that the present disclosure is directed.

BRIEF SUMMARY

Described herein are various antimicrobial SLG articles that have improved resistance to discoloration when exposed to harsh conditions, along with methods for their manufacture and use.

One type of improved antimicrobial SLG article includes a glass substrate with a thickness, t; a compressive stress layer or region that extends inward from a primary surface of the glass substrate to a first depth to about 0.15*t or greater; and an antimicrobial agent-containing layer or region having an antimicrobial agent that extends inward from a primary surface of the glass substrate to a second depth that is less than the thickness of the compressive stress layer or region, all layers and regions configured such that the glass article experiences substantially no discoloration when exposed to harsh conditions. In some embodiments, the second depth is less than the first depth.

In some embodiments, the discoloration may be characterized as low absorbance such as about 0.10 or less at a wavelength range of about 450-550 nm. In some aspects, the antimicrobial SLG article will possess a low or negligible concentration of tin or other metallic ions with a propensity to react with antimicrobial agents (e.g., $Ag^+$ ions) at its primary surfaces. In some aspects, the SLG article includes tin or the tin that is commonly found in SLG substrates is not removed.

This type of antimicrobial SLG article can further include an additional layer disposed on one or more primary surfaces of the glass substrate. The additional layer can include a reflection-resistant coating, a glare-resistant coating, fingerprint-resistant coating, smudge-resistant coating, a color-providing composition, an environmental barrier coating, or an electrically conductive coating.

In certain implementations of this type of improved antimicrobial SLG article, an average (surface) compressive stress can be about 50 megapascals or greater, about 100 megapascals or greater, about 120 megapascals or less, or about 150 megapascals or less. The depth of the compressive stress layer can be greater than or equal to about 25 micrometers and less than or equal to about 1000 micrometers or about 100 micrometers or greater. In some aspects, the improved antimicrobial SLG article employs a heat-treated glass substrate and can possess a compressive stress layer that exceeds 100 micrometers in depth and/or 100 megapascals in average compressive stress. In other aspects, the improved SLG article employs a heat-treated glass substrate and can possess a compressive stress layer that can possess an average compressive stress of about 100 megapascals to about 120 megapascals, and/or the depth of the compressive stress layer can be greater than or equal to about 25 micrometers and less than or equal to about 1000 micrometers.

In some embodiments, the article may include a second compressive stress layer that extends to a third depth that is less than the first depth, less than the second depth, or less than both the first depth and the second depth. The average surface compressive stress of such articles may be about 200 megapascals or greater, or 300 megapascals or greater.

In some implementations of this type of improved antimicrobial SLG article, the antimicrobial agent-containing region can have an average thickness of less than or equal to about 100 micrometers, less than or equal to about 15 micrometers or less than or equal to about 5 micrometers. A silver concentration (e.g., when silver is employed as the antimicrobial agent) in an outermost portion of such an antimicrobial agent-containing region can be up to about 40 weight percent. In some aspects, the silver concentration at the surface of the SLG substrate is between about 1 weight percent and about 40 weight percent, about 3 weight percent to about 40 weight percent, or about 5 weight percent to about 40 weight percent.

In some embodiments, the article may include a concentration of any one or more of potassium, sodium and the antimicrobial agent within a specified depth from the surface (e.g., 2 micrometers, 5 micrometers or 10 micrometers). In some embodiments, potassium may comprise about 75% or less or about 75% or more of the combined amount of potassium, sodium and the antimicrobial agent along the specified depth. The amount of potassium can be tailored by the processing conditions utilized. In some aspects, the antimicrobial agent may comprise about 0.5% or more of the combined amount of potassium, sodium and the antimicrobial agent along the specified depth. The absolute amount of potassium (measured as $K_2O$) within a 1 micrometer depth may be up to about 2 weight percent (e.g., about 0.1 weight percent to about 2 weight percent, about 1 weight percent to about 1.8 weight percent or about 1.3 weight percent to about 1.6 weight percent).

The harsh conditions to which such SLG articles may be exposed can include temperatures of greater than or equal to about 200 degrees Celsius, relative humidity levels of greater than or equal to about 80 percent, reducing environments, oxidizing environments, or a combination thereof. For example, the harsh conditions can include polymerization of a fingerprint- and/or smudge-resistant coating on the surface of the glass substrate at elevated temperatures, direct bonding of an adhesive used to adhere the glass substrate to another device, sputtering of a transparent electrode on the surface of the glass substrate, thermal curing of an ink layer or frit layer on the surface of the glass substrate, plasma cleaning of the surface of the glass substrate, chemical etching of the surface of the glass substrate, annealing of the surface of the glass substrate, chemical cleaning of the surface of the glass substrate, or a combination thereof.

The harsh conditions can also include the various processes associated with fabricating the antimicrobial SLG substrates. For example, the processes employed to impart antimicrobial properties in the SLG substrates can result in discoloration of the substrate. When $Ag^+$ ions are exchanged into the SLG substrates to form an antimicrobial agent-containing layer, the $Ag^+$ ions can react with $Sn^{2+}$ present in the "tin side" of the substrate, precipitating out as Ag crystals. These Ag crystals can then cause discoloration in the substrates from surface plasmon resonance effects.

Substantially no discoloration can include a change in optical transmittance of the glass article of less than or equal to about 3 percent relative to an optical transmittance before exposure to the harsh conditions, a change in haze of the glass article of less than or equal to about 5 percent relative to a haze before exposure to the harsh conditions, and/or a change in CIE 1976 color coordinates $L^*$, $a^*$, and $b^*$ of the SLG article of less than or equal to about ±0.2, ±0.1, and ±0.1, respectively. Substantially no discoloration can also include a CIE 1976 color coordinate $b^*$ such that $0<b^*<2$ for certain implementations of the antimicrobial SLG articles.

In some aspects, substantially no discoloration can include a transmittance of 90% or greater over the visible spectrum (about 380 to 780 nm).

This type of antimicrobial SLG article can exhibit at least a 5 log reduction in a concentration of at least *Staphylococcus aureus, Enterobacter aerogenes*, and *Pseudomonas aeruginosa* bacteria under JIS Z 2801 (2000) testing conditions. This type of antimicrobial SLG article can also exhibit at least a 3 log reduction in a concentration of at least *Staphylococcus aureus* (*S. aureus*), *Enterobacter aerogenes* (*E. aerogenes*), *Escherichia coli* (*E. Coli*) and *Pseudomonas aeruginosa* (*P. aeruginosa*) bacteria under modified JIS Z 2801 (2000) testing conditions, wherein the modified conditions comprise heating the antimicrobial glass article to a temperature of about 23 degrees Celsius to about 37 degrees Celsius at a humidity of about 38 percent to about 42 percent for about 24 hours followed by drying for about 6 hours to about 24 hours. This type of antimicrobial SLG article can also exhibit at least a 2 log reduction in a concentration of at least *S. aureus, E. aerogenes, E. coli*, and *Pseudomonas aeruginosa* bacteria under modified EPA testing conditions, wherein the modified conditions comprise heating the antimicrobial glass article to a temperature of about 23 degrees Celsius at a humidity of about 38 percent to about 42 percent for about 2 hours (hereinafter referred to as the "Dry Test"). The Dry Test is described in U.S. Provisional Patent Application No. 61/908,401, which is hereby incorporated by reference in its entirety as if fully set forth herein. These levels of antimicrobial efficacy are maintained in some instances even after the SLG article is subjected to any one of being boiled in water having a temperature of about 98° C. or greater for about 1 hour, being exposed to an environment having a temperature of about 60° C. and 85% relative humidity for 24 hours, and being cooled to a temperature of about 4° C. (e.g., 2° C. or less or about 1° C. or less).

In some instances, the improved antimicrobial SLG article may exhibit a flatness of about 1% or less. As used herein, flatness refers to the measurement of a maximum height/minimum height of the article, after being placed on a flat surface, to provide a percentage of flatness. The improved antimicrobial SLG article may also exhibit an improved mechanical strength and may, in some instances, be used as safety glass. Improved mechanical strength may include exhibiting an average flexural strength, as measured by ring-on-ring testing, of about 600 kgf or greater.

This type of improved antimicrobial SLG article can serve as a portion of a touch-sensitive display screen or cover plate for an electronic device, a non-touch-sensitive component of an electronic device, a surface of a household appliance, a surface of medical equipment, a biological or medical packaging vessel, a surface of an architectural component, or a surface of a vehicle component.

One type of method of making an antimicrobial SLG article includes providing a SLG substrate having a thickness, t, and a primary surface. The SLG substrate may include a compressive stress layer that extends from the primary surface to a first depth. In some embodiments, the first depth is greater than or equal to about 0.15 times the substrate thickness. In some embodiments, the method includes forming such compressive stress layer to a first depth. The method of some embodiments may include forming an antimicrobial agent-containing region that extends inward from the primary surface of the glass substrate to a second depth, such that the antimicrobial SLG article experiences substantially no discoloration when exposed to harsh conditions. In some embodiments, the method optionally includes removing a portion of the primary surface to form a processed primary surface, which may occur before or after formation of any one or more of the compressive stress layer extending to the first depth and the antimicrobial agent-containing region. In one implementation, the method also includes a step for heat treating the glass substrate, wherein the heat treating is performed before or immediately after the removing step.

In some aspects, the method produces an antimicrobial SLG article with a compressive stress layer having a thickness of 0.15*t or greater. Further, the thickness of the antimicrobial agent-containing region in these antimicrobial SLG articles produced according to the method can be less than the thickness of the compressive stress layer.

In some instances the method includes forming a second compressive stress layer that extends from the primary surface (or primary processed surface) to a third depth. The compressive stress layer extending to the first depth, and the second compressive stress layer extending to the third depth may be formed by thermal and/or chemical processing (e.g., heat treatment or ion exchange treatment). The antimicrobial agent-containing layer extending to the second depth may be formed by chemical treatment (e.g., ion exchange treatment). Where chemical treatment is utilized, the treatment includes ion-exchanging a plurality of ions (e.g., alkali ions such as sodium, potassium and the like and/or antimicrobial agent ions) into the primary surface (or primary processed surface) to the first depth, second depth or third depth.

In some cases, the step of forming one or both of the compressive stress layers and the step of forming the antimicrobial agent-containing region occur simultaneously. In other cases, the compressive stress layer extending to the first depth is formed before the antimicrobial agent-containing region has been formed in a two-step process. In other cases, the compressive stress layer extending to the second depth is formed simultaneously with the antimicrobial-containing region (in a single chemical treatment step) or before the antimicrobial agent-containing region has been formed (in two chemical treatment steps).

In some instances, the chemical treatment may include immersing the substrate into a molten bath comprising an antimicrobial agent precursor and any one or more of $KNO_3$ and $NaNO_3$. In other embodiments, the molten bath may include $AgNO_3$ and a eutectic salt mixture of $KNO_3$ and $NaNO_3$ (which may have a temperature of about 300° C. or less). As used herein, a "eutectic salt mixture" refers to a mixture of salt components. For example, where KNO3 and NaNO3 are utilized, the eutectic salt mixture includes 40-60% KNO3 and 40-60% NaNO3, where the sum of KNO3 and NaNO3 salts equals 80-100%. In other instances, the chemical treatment may include immersing the substrate in an aqueous solution comprising an antimicrobial agent precursor (which may have a temperature of about 250° C. or less). The molten bath with a eutectic salt mixture or the aqueous solution may include a concentration of $AgNO_3$ in the range from about 0.01 weight percent to about 1 weight percent.

In some cases, the method can also include forming an additional layer on at least a portion of one or more primary surfaces of the SLG substrate, wherein the additional layer comprises a reflection-resistant coating, a glare-resistant coating, fingerprint-resistant coating, smudge-resistant coating, a color-providing composition, an environmental barrier coating, or an electrically conductive coating.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
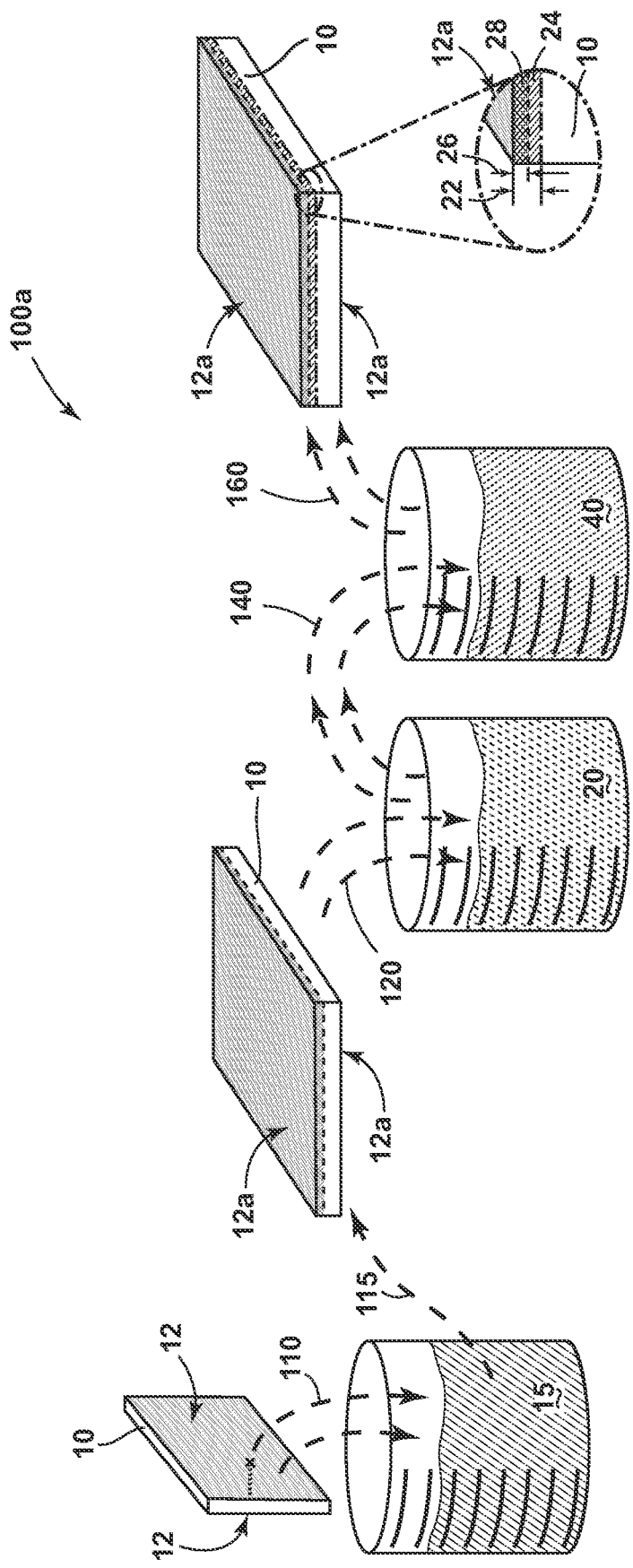
FIG. 1A is a schematic of a method of making an antimicrobial SLG article that is treated with a two-step ion exchange process according to an aspect of the disclosure.

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Described herein are various antimicrobial SLG articles that have improved resistance to discoloration or substantially no discoloration when exposed to harsh conditions (i.e., during substrate processing, manufacture and/or use of the articles), along with methods for their manufacture and use. The term "antimicrobial" refers herein to the ability to kill or inhibit the growth of more than one species of more than one type of microbe (e.g., bacteria, viruses, fungi, and the like).

As detailed herein, substantially no discoloration can include a change in optical transmittance of the glass article of less than or equal to about 3 percent relative to an optical transmittance before exposure to the harsh conditions, a change in haze of the glass article of less than or equal to about 5 percent relative to a haze before exposure to the harsh conditions, and/or a change in CIE 1976 color coordinates L*, a*, and b* of the SLG article of less than or equal to about ±0.2, ±0.1, and ±0.1, respectively. Substantially no discoloration can also include a CIE 1976 color coordinate b* such that 0<b*<2 (or b*≤1.8, ≤1.5, ≤1, ≤0.8, ≤0.6, ≤0.5, ≤0.4, ≤0.2 or ≤0.1) for certain implementations of the antimicrobial SLG articles. In some aspects, substantially no discoloration can include a transmittance of 90% or greater over the visible spectrum (about 380 to 780 nm). In other instances, substantially no discoloration may include low absorbance (e.g., about 0.01 or less) at a wavelength of about 450-550 nanometers.

In general, the improved SLG articles and methods described herein involve the use of a glass substrate comprising a soda lime glass composition. Typically, SLG compositions have appreciable concentrations of non-bridging oxygens (NBOs). As used herein, the term "non-bridging oxygens" is intended to refer to those oxygen atoms within the glass that are covalently bonded to only one other atom, thus bearing a negative charge that can be compensated by a vicinal positively charged ion. This is in contrast to those oxygen atoms within the glass that are covalently bonded to two other atoms (such oxygen atoms being termed "bridging oxygens"). For the purposes of the present disclosure, the concentration of NBOs in a given glass composition can be determined by subtracting the sum of the concentrations, in mole percent (mol %), of all alkali metal oxides from the concentration, in mol %, of aluminum oxide. That is, NBO (mol %)=Al$_2$O$_3$ (mol %)–(Σ alkali metal oxides (mol %)).

As used herein, the term "harsh conditions" relates to conditions experienced by the SLG articles and substrates during their lifetime, usage and application environment, including but not limited to temperatures of greater than or equal to about 200° Celsius, relative humidity levels of greater than or equal to about 80 percent, reducing environments, oxidizing environments, or a combination thereof. For example, the harsh conditions can be generated during formation of any optional additional layers disposed on the surface and can include during polymerization of a fingerprint- and/or smudge-resistant coating on the surface of the glass substrate at elevated temperatures, during direct bonding of an adhesive used to adhere the glass substrate to another device, during sputtering of a transparent electrode on the surface of the glass substrate, during thermal curing of an ink layer or frit layer on the surface of the glass substrate, during plasma cleaning of the surface of the glass substrate, during chemical etching of the surface of the glass substrate, during annealing of the surface of the glass substrate, during chemical cleaning of the surface of the glass substrate, or a combination thereof. The "harsh conditions" also can include various processes associated with fabricating the antimicrobial SLG articles and substrates. For example, the processes employed to impart antimicrobial properties in the SLG substrates can result in discoloration of the substrate. When Ag$^+$ ions are ion-exchanged into the SLG substrates to form an antimicrobial agent-containing layer, the Ag$^+$ ions can react with Sn$^{2+}$ present in the "tin side" of the substrate, precipitating out as Ag crystals. These Ag crystals can then cause discoloration in the substrates from surface plasmon resonance effects.

The glass substrates of the improved SLG articles can be fabricated according to many methods, including slot draw and float processes, along with non-float processes. When float processes are employed, one of the primary surfaces of the substrates often will be in contact with a molten metallic bath, such as molten tin. As a result, this surface of the glass substrate will possess an appreciable concentration of tin ions (e.g., Sn$^{2+}$ ions on the "tin side"). The depth of the tin penetration can be on the order of 12-30 μm, depending on the particular composition of the glass substrate and the parameters of the float process employed to produce the substrate. The other surface of the substrate opposite from the "tin side" is generally exposed to air (hereinafter defined as the "air side"). On the "tin side" of the SLG substrate, an exemplary composition is: 69-75 wt % SiO$_2$, 0-1.5 wt % Al$_2$O$_3$, 8-12 wt % CaO, 0-0.1 wt % Cl, 0-500 ppm Fe, 0-500 ppm K, 0.0-4.5 wt % MgO, 12-15 wt % $Na_2O$, 0-0.5 wt % $SO_3$, 0-0.5 wt % $SnO_2$, 0-0.1 wt % SrO, 0-0.1 wt % $TiO_2$, 0-0.1 wt % ZnO, and 0-0.1 wt % $ZrO_2$. On the "air side" of the SLG substrate, an exemplary composition is: 73.16 wt % $SiO_2$, 0.076 wt % $Al_2O_3$, 9.91 wt % CaO, 0.014 wt % Cl, 0.1 wt % $Fe_2O_3$, 0.029 wt % $K_2O$, 2.792 wt % MgO, 13.054 wt % $Na_2O$, 0.174 wt % $SO_3$, 0.001 $SnO_2$, 0.01 wt % SrO, 0.01 wt % $TiO_2$, 0.002 wt % ZnO, and 0.005 wt % $ZrO_2$.

The improved antimicrobial SLG articles described herein generally include a glass substrate with a thickness, t; a compressive stress layer or region that extends inward from a surface of the glass substrate to a first depth; and an antimicrobial agent-containing layer or region having an antimicrobial agent that extends inward from a surface of the glass substrate to a second depth that is less than the thickness of the compressive stress layer or region, all layers and regions configured such that the SLG article experiences substantially no discoloration when exposed to harsh conditions. The first depth may be about 0.15*t or greater. In some aspects, the thickness of the SLG substrate is up to about 7 mm (e.g., 3.6 mm, 6 mm, and other thicknesses). Throughout this specification, the term "compressive stress layer" shall be used to refer to the layer or region of compressive stress, and the term "antimicrobial agent-containing region (or layer)" shall be used to refer to the layer or region containing the antimicrobial agent species (e.g., $Ag^+$ ions). This usage is for convenience only, and is not intended to provide a distinction between the terms "region" or "layer" in any way.

The SLG substrate can adopt a variety of physical forms. That is, from a cross-sectional perspective, the substrate can be flat or planar, or it can be curved and/or sharply-bent. Similarly, it can be a single unitary object, or a multi-layered structure or a laminate.

Regardless of its composition or physical form, the SLG substrate may include a layer or region under compressive stress that extends inward from a primary surface of the glass substrate to a specific depth therein. In some aspects of an SLG substrate having a thickness, t, the thickness of the compressive stress layer or first depth is set at about 0.15*t or greater. This compressive stress layer can be formed from one or more strengthening processes (e.g., by heat treatment, including thermal tempering, chemical treatment, including ion-exchange, or like processes). The amount of compressive stress (CS) and the depth of the compressive stress layer (DOL) can be varied based on the particular use for the SLG article, with the proviso that the CS and DOL should be limited such that a tensile stress created within the glass as a result of the compressive stress layer does not become so excessive as to render the glass article frangible.

In addition, the SLG substrate will include an antimicrobial agent-containing layer or region having an antimicrobial agent that extends inward from a surface of the glass substrate (which may include the primary surface) to a specific depth therein. The depth of the antimicrobial agent-containing layer or region is referred to herein as the second depth. The antimicrobial agent-containing region can comprise cationic monovalent silver ions ($Ag^+$) in an amount effective to impart antimicrobial behavior to the SLG article according to some aspects. In general, the antimicrobial agent-containing region, like the compressive stress layer, extends inward from the surface of the glass substrate. In some aspects, the thickness of the antimicrobial agent-containing layer (or second depth) is less than the thickness of the compressive stress layer (or first depth) within the SLG substrate. Thus, the antimicrobial agent-containing region can at least partially overlap with the compressive stress layer. The depth of the antimicrobial agent-containing region will generally be limited so as to avoid visible coloration in the glass article, while not so limited as to reduce the antimicrobial efficacy of the cationic silver within the SLG substrate.

In some instances, the SLG article may include a second compressive stress layer which may extend from a surface (which may be the primary surface) to a third depth within the SLG substrate. The third depth may be less than the first depth (of the compressive stress layer), less than the second depth (of the antimicrobial agent-containing layer), or less than both the first depth and the second depth. The second compressive stress layer increases the average surface compressive stress of the SLG article (e.g., by about 50 megapascals or more, about 100 megapascals or more or about 200 megapascals or more). In some instances, the second compressive stress layer may be formed at the same time as the antimicrobial agent-containing layer or separately from the antimicrobial agent-containing layer (i.e., before or after formation of the antimicrobial agent-containing layer).

In one or more embodiments, the SLG article may have an average surface compressive stress of about 100 megapascals or greater, about 120 megapascals or greater, about 200 megapascals or greater, or about 300 megapascals or greater. In some embodiments, the average surface compressive stress may be in the range from about 100 megapascals to about 300 megapascals, from about 100 megapascals to about 200 megapascals, or from about 100 megapascals to about 120 megapascals. As discussed above, the depth of the compressive stress layer(s) (or depth of layer) may be greater than or equal to about 0.15 times the substrate thickness. In some instances, the depth of layer may be in the range from about 25 micrometers to about 100 micrometers. In some instances, the depth of layer may be 100 micrometers or greater.

The SLG article may have a surface concentration of antimicrobial agent of about 1 weight percent or greater. In some instances, the concentration of the antimicrobial agent at the surface may be up to about 40 weight percent (e.g., about 1 weight percent to about 40 weight percent, from about 2 weight percent to about 40 weight percent, from about 3 weight percent to about 40 weight percent, or from about 5 weight percent to about 40 weight percent). In some instances, the concentration of the antimicrobial agent at the surface is in the range from about 1 weight percent to about 25 weight percent, from about 1 weight percent to about 20 weight percent, from about 1 weight percent to about 15 weight percent, from about 5 weight percent to about 25 weight percent, from about 5 weight percent to about 20 weight percent, from about 10 weight percent to about 30 weight percent, from about 15 weight percent to about 25 weight percent, or from about 6 weight percent to about 27 weight percent.

The second depth or thickness of the antimicrobial agent-containing region is less than about 100 micrometers, less than about 15 micrometers, less than about 10 micrometers, less than about 5 micrometers, or less than about 2 micrometers. In some instances, the second depth or thickness of the antimicrobial agent-containing region may be in the range from about 5 micrometers to about 15 micrometers. The concentration of the antimicrobial agent may be characterized within the specified depth and in relation to the concentration of alkali components within the specified depth such as potassium, sodium or a combination thereof. In some embodiments, the SLG article may include a combined amount of potassium, sodium and antimicrobial agent within a thickness of the substrate of about 2 micrometers or about 5 micrometers from the surface (which may be the primary surface) and the potassium concentration may include less than about 75% of the combined amount of potassium, sodium and the antimicrobial agent. In other instances the antimicrobial agent comprises about 0.5% or more of the combined amount of potassium, sodium and antimicrobial agent within the specified thickness. In other embodiments, the potassium concentration may comprise about 75% or greater of the combined amount of potassium, sodium and the antimicrobial agent. In such instances, the antimicrobial agent may comprise about 0.5% or more of the combined amount of potassium, sodium and antimicrobial agent within the thickness.

The antimicrobial SLG articles described herein may exhibit improved strength. In some embodiments, the improved strength is in terms of improved average flexural strength, as measured by ring-on-ring ("ROR") testing. In some embodiments, the antimicrobial SLG articles exhibit an average flexural strength of about 500 kgf or greater, about 600 kgf or greater or about 700 kgf or greater. The ROR tests were generally performed according to the ASTM C-1499-03 standard test method for Monotonic Equibiaxial Flexural Strength of Advanced Ceramics at Ambient Temperatures, with a few modifications to test fixtures and test conditions as outlined in U.S. Patent Publication No. 2013/0045375, at [0027], incorporated by reference herein. Unless otherwise stated, the articles were not abraded prior to ROR testing.

There is no particular limitation on the average thickness of the SLG article contemplated herein. In many exemplary applications, however the average thickness will be less than or equal to about 15 millimeters (mm). If the antimicrobial SLG article is to be used in applications where it may be desirable to optimize thickness for weight, cost, and strength characteristics (e.g., in electronic devices, or the like), then even thinner substrates (e.g., less than or equal to about 5 mm) can be used. By way of example, if the antimicrobial glass article is intended to function in an architectural application, then the substrate can exhibit an average thickness of about 7 mm or less (e.g., 3.6 mm, 6 mm, etc.).

While the ultimate limit on the average surface compressive stress and depth of thickness of the compressive stress layer(s) is the avoidance of rendering the glass article frangible, the average depth of the compressive stress layer generally may be less than about one-third of the thickness of the glass substrate. In most applications, however, the average depth of the compressive stress layer may be greater than or equal to about 25 µm and less than or equal to about 100 µm. Similarly, the average surface CS may be between about 100 megapascals (MPa) and about 1.2 gigapascals (GPa). In most applications, the average surface CS may be greater than 400 MPa and less than or about 600 MPa. In certain aspects, the SLG article employs a heat-treated glass substrate and can possess a compressive stress layer that exceeds 100 micrometers.

As stated above, the thickness of the antimicrobial agent-containing region of the SLG articles should be limited so as to avoid visible coloration in the glass article and to maximize the antimicrobial efficacy of the cationic silver within the SLG substrate. As with the depth of the compressive stress layer, the average thickness or depth of the antimicrobial agent-containing region generally will be less than about one-third of the thickness of the glass substrate. In certain implementations, the depth of the antimicrobial-agent containing region may be less than the depth of the compressive stress layer(s). The exact thickness, however, will vary depending on how the antimicrobial agent-containing region is formed.

In general, the optical transmittance of the antimicrobial SLG article will depend on the type of materials chosen. For example, if a glass substrate is used without any pigments added thereto and/or any optional additional layers are sufficiently thin, the article can have a transparency over the entire visible spectrum (i.e., about 380 nm to about 780 nm) of at least about 85%. In certain cases where the antimicrobial glass article is used in the construction of a touch screen for an electronic device, for example, the transparency of the antimicrobial SLG article can be at least about 90% over the visible spectrum. In situations where the glass substrate comprises a pigment (or is not colorless by virtue of its material constituents) and/or any optional additional layers are sufficiently thick, the transparency can diminish, even to the point of being opaque across the visible spectrum. Thus, there is no particular limitation on the optical transmittance of the antimicrobial glass article itself.

Like transmittance, the haze of the antimicrobial SLG article can be tailored to the particular application. As used herein, the terms "haze" and "transmission haze" refer to the percentage of transmitted light scattered outside an angular cone of ±4.0° in accordance with ASTM procedure D1003, the contents of which are incorporated herein by reference in their entirety as if fully set forth below. For an optically smooth surface, transmission haze is generally close to zero. In those situations when the antimicrobial glass article is used in the construction of a touch screen for an electronic device, the haze of the article can be less than or equal to about 5%.

Regardless of the application or use, the antimicrobial SLG articles described herein offer improved discoloration resistance to harsh conditions (as described herein) relative to existing antimicrobial glass articles. While discoloration resistance can appear to be a qualitative and potentially subjective characterization, there are a number of quantifiable indications of discoloration resistance, examples of which will now be described.

One quantifiable indication of this improved resistance to discoloration can be seen in the change in the optical transmittance that is observed over time. This change can be measured after the formation of the antimicrobial agent-containing region but before the SLG article is exposed to any harsh conditions and after the glass article is exposed to harsh conditions. In general, the optical transmittance of the SLG articles described herein can be substantially similar both before and after exposure to harsh conditions. In certain implementations, the change in the transmittance of the glass articles described herein after exposure to harsh conditions can be about ±3%. In other implementations, the change in the transmittance of the glass articles described herein after exposure to harsh conditions can be about ±0.5%.

Another quantifiable indication of improved resistance to discoloration is the change in absorbance at about 430 nm, which corresponds to the plasmon resonance associated with the formation of metallic silver nanoparticles (from cationic silver species) in the SLG articles over time. This change can be measured after the formation of the antimicrobial agent-containing region but before the glass article is exposed to any harsh conditions and after the glass article is exposed to harsh conditions. In general, the absorbance at about 430 nm of the glass articles described herein can be substantially similar both before and after exposure to harsh conditions. In certain implementations, the change in the absorbance at about 430 nm of the glass articles described herein after exposure to harsh conditions can be about ±25%. In other implementations, the change in the transmittance of the SLG articles described herein after exposure to harsh conditions can be limited to ±10%.

Yet another quantifiable indication of the improved resistance to discoloration is the change in haze that is observed over time. This change can be measured after the formation of the antimicrobial agent-containing region but before the SLG article is exposed to any harsh conditions and after the glass article is exposed to harsh conditions. In general, the overall haze of the glass articles described herein after exposure to harsh conditions can be substantially similar to the haze of the as-produced glass articles. In certain implementations, the change in the haze of the SLG articles described herein after exposure to harsh conditions can be about ±5%. In other implementations, the change in the haze of the glass articles described herein after exposure to harsh conditions can be about ±2%.

Still another quantifiable indication of the improved resistance to discoloration is the change in CIE 1976 color space coordinates (in transmission or reflection) that is observed over time. This change can be measured after the formation of the antimicrobial agent-containing region but before the SLG article 10, 10$h$ is exposed to any harsh conditions and after the glass article is exposed to harsh conditions. In general, the individual coordinates (i.e., L*, a*, and b*) of the glass articles described herein after exposure to harsh conditions can be substantially similar to the individual coordinates of the as-produced glass articles. In certain implementations, the change in the L*, a*, and b* coordinates of the SLG articles described herein after exposure to harsh conditions can be about ±0.2, ±0.1, and ±0.1, respectively. In other implementations, the change in the L*, a*, and b* coordinates of the SLG articles described herein after exposure to harsh conditions can be about ±0.1, ±0.05, and ±0.05, respectively. The resistance to discoloration may also be described in absolute terms in that the SLG article exhibits CIE 1976 color space coordinates that approximate (0,0) in transmission and/or reflection or exhibit a low color shift with respect to the coordinates (0,0). Color shift was determined by the equation: $\sqrt{(a^*)^2+(b^*)^2}$. In further implementations, the antimicrobial SLG articles can exhibit a CIE 1976 color coordinate b* such that 0<b*<2 (or 1.5, 1, 0.5 or 0.1).

The antimicrobial activity and efficacy of the antimicrobial SLG articles 10, 10$h$ described herein can be quite high. The antimicrobial activity and efficacy can be measured in accordance with Japanese Industrial Standard JIS Z 2801 (2000), entitled "Antimicrobial Products—Test for Antimicrobial Activity and Efficacy," the contents of which are incorporated herein by reference in their entirety as if fully set forth below. Under the "wet" conditions of this test (i.e., about 37° C. and greater than 90% humidity for about 24 hours), the antimicrobial glass articles described herein can exhibit at least a 5 log reduction in the concentration (or a kill rate of 99.999%) of one or more of *S. aureus, E. aerogenes, E. coli* and *P. aeruginosa* bacteria. In certain implementations, the antimicrobial SLG articles described herein can exhibit at least a 7 log reduction in the concentration of any bacteria to which it is exposed under these testing conditions.

In scenarios where the wet testing conditions of JIS Z 2801 do not reflect actual use conditions of the antimicrobial SLG articles described herein (e.g., when the SLG articles are used in electronic devices, or the like), the antimicrobial activity and efficacy can be measured using "drier" conditions. For example, the glass articles can be tested between about 23 and about 37° C. and at about 38 to about 42% humidity for about 24 hours. Specifically, 5 control samples and 5 test samples can be used, wherein each sample has a specific inoculum composition and volume applied thereto, with a sterile coverslip applied to the inoculated samples to ensure uniform spreading on a known surface area. The covered samples can be incubated under the conditions described above, dried for about 6 to about 24 hours, rinsed with a buffer solution, and enumerated by culturing on an agar plate, the last two steps of which are similar to the procedure employed in the JIS Z 2801 test. Using this test, the antimicrobial glass articles described herein can exhibit at least a 3 log reduction in the concentration (or a kill rate of 99.9%) of one or more of *S. aureus, E. aerogenes, E. coli* and *P. aeruginosa* bacteria.

In other scenarios where the wet testing conditions of JIS Z 2801 and/or the modified JIS Z 2801 test do not reflect actual use conditions of the antimicrobial SLG articles 10, 10$h$ described herein (e.g., when the glass articles are used in electronic devices, or the like), the antimicrobial activity and efficacy can also be measured using the Dry Test conditions. The Dry Test conditions are modeled upon an U.S. EPA test protocol for assessing the antimicrobial efficacy of Cu-containing surfaces. These conditions described herein are collectively referred to herein as "Dry Test" or "modified EPA Test" conditions. The antimicrobial SLG articles may exhibit at least a 2 log reduction in the concentration (or kill rate of 99%) of one or more of *S. aureus, E. aerogenes, E. coli* and *P. aeruginosa* bacteria when tested under the Dry Test, which is described in U.S. Provisional Patent Application No. 61/908,401, and hereby incorporated by reference in its entirety as if fully set forth below.

In certain implementations, the antimicrobial SLG articles can include an additional layer disposed on the surface of the glass substrate. The optional additional layer(s) can be used to provide additional features to the antimicrobial glass article (e.g., reflection resistance or anti-reflection properties, glare resistance or anti-glare properties, fingerprint resistance or anti-fingerprint properties, smudge resistance or anti-smudge properties, color, opacity, environmental barrier protection, electronic functionality, and/or the like). In some embodiments, the additional layer may include a decorative layer or a layer of polymeric material, ink or frit disposed on a surface, which may include the primary surface. In one or more embodiments, the additional layer is present before formation of the antimicrobial agent-containing region, the compressive stress layer(s) or both the antimicrobial agent-containing region and the compressive stress layer(s). Some embodiments of the methods described herein permit formation of the antimicrobial agent-containing region, the compressive stress layer(s) or both the antimicrobial agent-containing region and the compressive stress layer(s) through or with the additional layer disposed on the primary surface without altering the additional layer (in terms of mechanical, electrical and/or optical properties) or substantial discoloration to the SLG article. Materials that can be used to form the optional additional layer(s) generally are known to those skilled in the art to which this disclosure pertains.

Methods of making the above-described articles generally include the steps of providing a SLG substrate having a thickness, t and a compressive stress layer that extends inward from a surface of the glass substrate to a first depth, and forming an antimicrobial agent-containing region that extends inward from the surface of the glass substrate to a second depth, such that the as-produced glass article experiences little-to-no discoloration when exposed to harsh conditions. In some embodiments, the method includes forming the compressive stress layer in the SLG substrate extending to the first depth. The first depth of the compressive stress layer may be about 0.15*t or greater. Further, the second depth of the antimicrobial agent-containing region may be less than the first depth of the compressive stress layer. In one or more embodiments, the method may include forming a second compressive stress layer extending from the surface of the SLG substrate to a third depth, as described herein. The step of forming the second compressive stress layer may be described as increasing the average surface compressive stress of the SLG substrate.

In those embodiments where the optional additional layer is implemented, the methods generally involve an additional step of forming the additional layer on at least a portion of the surface of the substrate.

The selection of materials used in the SLG substrates and optional additional layers can be made based on the particular application desired for the final glass article. In general, however, the specific materials will be chosen from those described above.

Provision of the SLG substrate can involve selection of a glass object as-manufactured, or it can entail subjecting the as-manufactured glass object to a treatment in preparation for any of the subsequent steps. Examples of such treatments include physical or chemical cleaning, physical or chemical etching, physical or chemical polishing, other material surface material removal processes, annealing, tempering, and shaping, including various combinations and sequences of these treatments.

Once the SLG substrate has been selected and/or prepared, the compressive stress layer(s) and/or the antimicrobial agent-containing region can be formed therein. That is, the compressive stress layer(s) can be formed before, or simultaneously with the antimicrobial agent-containing region.

Formation of the compressive stress layer can be accomplished in a variety of ways, of which heat or thermal treatment (including thermal tempering) and chemical treatment (such as ion exchange) are the most common. Similarly, the antimicrobial agent-containing region can be formed in a variety of ways, of which chemical diffusion (which optionally can be accompanied by the exchange of another cation out from the glass) of cationic silver from a silver-containing medium (e.g., paste, dispersion, ion exchange bath of molten salts, or the like) is the most common.

In one exemplary implementation, the compressive stress layer extending to the first depth is formed by thermal treatment or chemical treatment, which can occur before forming the antimicrobial agent. Where the method includes forming a second compressive stress layer, such second compressive stress layer may be formed before, after or simultaneously with forming the antimicrobial agent-containing region.

In one exemplary implementation, the method includes forming the compressive stress layer (or the second compressive stress layer) before forming the antimicrobial agent-containing region and entails a first step of immersing the SLG substrate into a molten bath including $KNO_3$, $NaNO_3$, $LiNO_3$ or a combination thereof to impart the compressive stress via ion exchange followed by a second step of immersing the strengthened glass into a $AgNO_3$-containing molten salt bath (e.g., a molten salt bath containing $AgNO_3$ and a balance of $KNO_3$, $NaNO_3$, $LiNO_3$ or a combination thereof) or an aqueous solution including $AgNO_3$ to ion exchange $Ag^+$ into the glass (i.e., a "two-step ion exchange process"). The second bath may have a temperature in the range from about 150° C. to about 450° C. and may include from about 1 wt % to about 100 wt % $AgNO3$ and the balance including $KNO_3$, $NaNO_3$, $LiNO_3$ or a combination thereof.

In another exemplary implementation, the method includes heat treating the SLG substrate to generate a compressive stress layer before forming the antimicrobial agent-containing region. The same bath used for form the antimicrobial agent-containing region as used in the two-step ion exchange process and the one-step ion exchange process described below, may be used.

Another exemplary implementation of a method includes forming the compressive stress layer (or the second compressive stress layer) and the antimicrobial agent-containing region simultaneously and entails immersing the glass into a molten salt bath comprising $AgNO_3$ and $KNO_3$, $NaNO_3$, $LiNO_3$ or a combination thereof, to ion exchange $K^+$ and/or $Na^+$ and $Ag^+$ into the SLG together (i.e., a "one-step ion exchange process).

Another exemplary implementation of the method includes forming the antimicrobial agent-containing region by immersing the SLG substrate into a molten bath including $AgNO_3$ and a eutectic salt mixture of $KNO_3$ and $NaNO_3$ to simultaneously impart a compressive stress via ion exchange and to ion exchange $Ag^+$ into the glass in a one-step ion exchange process. The eutectic salt mixture may include a combination of $KNO_3$, $NaNO_3$ and $LiNO_3$. In another exemplary implementation, the method includes forming the antimicrobial agent-containing region using an aqueous solution. In such embodiments, the SLG substrate may include a compressive stress layer that is formed by thermal treatment, chemical treatment or a combination thereof. The method includes immersing the SLG substrate (which may include one or more compressive stress layers) into an aqueous solution including $AgNO_3$ Referring to FIG. 1A, a method of making an antimicrobial SLG article 100a is provided. In the method 100a, an SLG glass article 10 is employed having primary surfaces 12 and a plurality of ion-exchangeable metal ions. In an exemplary embodiment, glass article 10 can comprise a soda lime glass composition having ion-exchangeable metal ions. The metal ions are exchangeable in the sense that exposure of the glass article 10 and primary surfaces 12 to a bath containing other metal ions can result in the exchange of some of the metal ions in the glass article 10 with metal ions from the bath. The bath may include a molten salt, a molten salt with a eutectic salt mixture or an aqueous solution as described herein. In one or more embodiments, a compressive stress is created by this ion exchange process in which a plurality of first metal ions in the glass article 10, and specifically the primary surfaces 12, are exchanged with a plurality of second metal ions (having an ionic radius larger than the plurality of first metal ions) so that a region of the glass article 10 comprises the plurality of the second metal ions. The presence of the larger second metal ions in this region creates the compressive stress in the region. The first metal ions may be alkali metal ions such as lithium, sodium, potassium, and rubidium. The second metal ions may be alkali metal ions such as sodium, potassium, rubidium, and cesium, with the proviso that the second alkali metal ion has an ionic radius greater than the ionic radius than the first alkali metal ion.

The SLG article 10 employed in the method 100a can adopt a variety of physical forms, including a glass substrate. That is, from a cross-sectional perspective, the glass article 10, when configured as a substrate, can be flat or planar, or it can be curved and/or sharply-bent. Similarly, glass article 10 can be a single unitary object, a multi-layered structure, or a laminate.

The SLG article 10 may also be combined with a layer, such as a functional layer, disposed on one or more primary surfaces 12. For example, the layer can include a reflection-resistant coating, a glare-resistant coating, a fingerprint-resistant coating, a smudge-resistant coating, a color-providing composition, an environmental barrier coating, a decorative coating, or an electrically conductive coating.

Referring again to FIG. 1A, the method of making an antimicrobial glass article 100a can include an optional step 110 for removing a portion of the primary surfaces 12 to form etched primary surfaces 12a. In step 110, the SLG article 10 is submersed in an etchant bath 15 set at an etching temperature for a predetermined time to etch a portion of the primary surfaces 12. In certain implementations, etchant bath 15 can comprise 1.5M HF/0.9M $H_2SO_4$ and etching can be conducted for about 4 to about 40 minutes to remove about 2 μm to about 20 μm of material from the primary surfaces 12. In another implementation, etchant bath 15 can comprise 20% HF and 10% $HNO_3$ and etching can be conducted for about 10 minutes to remove about 30 μm of material from the primary surfaces 12. By etching a portion of the primary surfaces 12 from the SLG article 10, the portion of the article containing a high concentration of metallic ions (e.g., $Sn^{2+}$ ions) can be removed, thus exposing etched primary surfaces 12a having a composition more consistent with the base soda lime glass composition of the SLG article 10. As such, these metallic ions will not be available to react with antimicrobial agents (e.g., $Ag^+$ ions) incorporated into the article in subsequent processing steps, reducing the likelihood of discoloration in the final, as-produced SLG article 10.

In some embodiments of method 100a, the removing step 110 is controlled such that material is removed from the SLG article 10 to a depth of removal (DOR) of about 2 μm to about 30 μm from the primary surfaces 12. The DOR can also be set between about 2 μm and about 20 μm and, preferably, the DOR is closer to 20 μm. In other embodiments of method 100a, the removing step 110 is controlled such that material is removed from the SLG article 10 to a DOR of about 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm.

Various processes can be employed in the removing step 110 of method 100a including but not limited to touch polishing, grinding, acid etching, and combinations of these processes. Other material-removal processes may be employed as understood by those with ordinary skill in the art, provided that they are adapted to remove surface and bulk flaws in the glass without impacting optical clarity. It should be understood that removing step 110 is optional or not employed in some implementations of method 100a, and in some implementations of methods 100b, 100c and 100d, described herein.

In some embodiments, the removing step 110 of the method 100a removes surface and bulk flaws preexisting from the manufacture of the SLG article 10 and/or associated with handling and other processing before development of the compressive stress and antimicrobial agent-containing layers or regions. Accordingly, the removing step 110 can play a role in enhancing the overall strength of the SLG article 10, above and beyond strength enhancements obtained, for example, from the development of the compressive stress layer 24 in step 120 (see FIG. 1A) or even heat treatment steps 40, 60 employed to produce SLG articles 10h (i.e., as employed in methods 100c and 100d depicted in FIGS. 5A and 5B).

Referring again to FIG. 1A, the method of making an antimicrobial SLG article 100a employs a first bath 20. The first bath 20 in the embodiment shown contains a plurality of ion-exchanging metal ions. In some embodiments, for example, bath 20 may contain a plurality of potassium ions that are larger in size than ion-exchangeable ions, such as sodium, contained in the SLG article 10. These ion-exchanging ions contained in the bath 20 will preferentially exchange with ion-exchangeable ions in the glass article 10 when the article 10 is submersed in the bath 20. In some embodiments, the first bath 20 comprises a molten $KNO_3$ bath at a concentration approaching 100% with additives as understood by those with ordinary skill in the art or at a concentration of 100%, sufficiently heated to a temperature to ensure that the $KNO_3$ remains in a molten state during processing of the glass article 10. In some implementations, the first bath 20 composed of 100% $KNO_3$ is set at about 430° C. The first bath 20 may also include the combination of $KNO_3$ and one or both of $NaNO_3$ and $LiNO_3$.

Still referring to FIG. 1A, the method of making an antimicrobial SLG article 100a includes a step 120 for submersing the glass article 10 into the first bath 20. Upon submersion into the first bath 20, a portion of the plurality of the ion-exchangeable ions (e.g., $Na^+$ ions) in the SLG article 10 are exchanged with a portion of the plurality of the ion-exchanging ions (e.g., $K^+$ ions) contained in the first bath 20. According to some embodiments, the submersion step 120 is conducted for a predetermined time based on the composition of the bath 20, temperature of the bath 20, composition of the glass article 10 and/or the desired concentration of the ion-exchanging ions in the glass article 10. In some implementations, SLG article 10 is submersed in step 120 within a bath 20 composed of 100% $KNO_3$ at 430° C. for about 7 hours.

After the submersion step 120 is completed, a washing step can be conducted to remove material from the first bath 20 remaining on the etched primary surfaces 12a of SLG article 10. Deionized water, for example, can be used in the washing step to remove material from the first bath 20 on the surfaces of the SLG article 10. Other media may also be employed for washing the surfaces of the glass article 10 provided that the media are selected to avoid any reactions with material from the first bath 20 and/or the glass composition of the glass article 10.

As the ion-exchanging ions from the first bath 20 are distributed into the SLG article 10 at the expense of the ion-exchangeable ions originally in the glass article 10, a compressive stress layer 24 develops in the glass article 10. The compressive stress layer 24 (also referred to as the "CS layer 24") extends from an etched primary surface 12a to a first CS layer depth 22 in the SLG article 10. In general, an appreciable concentration of the ion-exchanging ions from the strengthening bath 20 (e.g., $K^+$ ions) exists in the first CS layer 24 after the submersion step 120 and any subsequent washing steps. These ion-exchanging ions are generally larger than the ion-exchangeable ions (e.g., $Na^+$ ions), thereby increasing the compressive stress level in the first CS layer 24 within the SLG article 10. In addition, the amount of compressive stress associated with the first CS layer 24 and the first depth 22 can each be varied (by virtue of the conditions of the submersion step 120, for example) based on the intended use of the SLG article 10. In some embodiments, the surface CS in the compressive stress layer 24 is controlled such that tensile stresses generated within the glass article 10 as a result of the CS layer 24 do not become excessive to the point of rendering the glass article 10 frangible. In some embodiments, the average surface CS in the CS layer 24 may be about 200 MPa or greater. For example, the average surface CS level in the layer 24 may be up to about 300 MPa, about 400 MPa. In some implementations, the average surface CS level in the CS layer 24 of the SLG article 10 can range from about 200 to 600 MPa. The first depth 22 of the ion-exchanging ions and thus the layer 24 is often referred to as the depth of layer (DOL) and may be up to about 15 micrometers or about 50 micrometers, from about 15 micrometers to about 50 micrometers, from about 20 micrometers to about 45 micrometers, or from about 30 micrometers to about 40 micrometers.

In one or more embodiments, as will be described herein, the SLG substrate is thermally treated to impart a CS layer 24 to the first depth 22. In such embodiments, the first depth 22 is about 0.15 times the thickness of the SLG article or greater. Accordingly, in some embodiments, the SLG substrate with thermally-formed CS layer 24 may be further strengthened by immersing the first bath 20 to form a second compressive stress layer or may be immersed in an antimicrobial bath 40, shown in FIG. 1A without being immersed in the first bath 20.

Referring again to FIG. 1A, the method of making an antimicrobial glass article 100a additionally employs an antimicrobial bath 40 that comprises a plurality of metal ions that can provide an antimicrobial effect. In some embodiments, the antimicrobial bath 40 includes a plurality of antimicrobial agent ions, each of which can provide an antimicrobial effect. The antimicrobial agent ions may include silver ions or other ions of known antimicrobial agents. The antimicrobial bath 40 may also optimally also include a plurality of ion-exchangeable metal ions consistent with those present in the as-produced SLG article 10 a plurality of ion-exchanging ions consistent with those present in the first bath 20 or a combination thereof. According to an exemplary embodiment, the bath 40 employed in the method 100a can possess a plurality of silver ions derived from molten $AgNO_3$ at a bath concentration of about 0.01 weight percent to about 50 weight percent (e.g., about 0.1% to about 5% by weight, about 0.01 weight percent to about 0.1 weight percent). The balance of the molten bath of bath 40 may include molten $KNO_3$, molten $NaNO_3$, molten $LiNO_3$, a combination of molten $KNO_3$ and $NaNO_3$, or a eutectic salt mixture of any combination of $KNO_3$, $NaNO_3$ and $LiNO_3$. Where a eutectic salt mixture is utilized, the concentration of $AgNO_3$ may be in the range from about 0.1 weight percent to about 3 weight percent as described above.

In some embodiments, the antimicrobial bath 40 may include an aqueous solution of $AgNO_3$. The concentration of $AgNO3$ in the aqueous solution may be about 15 mols Ag/liter or less (e.g., about 12 mols Ag/liter or less, about 10 mols Ag/liter or less, about 9 mols Ag/liter or less, about 8 mols Ag/liter or less or about 7 mols Ag/liter or less).

According to some embodiments, the antimicrobial bath 40 employed in the method 100a can be set at a temperature depending on the composition of the antimicrobial bath 40. Where molten $KNO_3$, molten $NaNO_3$, a combination (non-eutectic) of molten $KNO_3$ and $NaNO_3$ is utilized, the temperature of the antimicrobial bath 40 may be in the range from about 340° C. to about 400° C. When antimicrobial bath 40 comprises molten $AgNO_3$ at a bath concentration of about 0.1% to about 0.4% by weight, bath 40 is preferably set at a temperature ranging from about 350° C. to about 390° C. for immersion times ranging from about 15 to about 90 minutes. In one implementation of method 100a, an antimicrobial bath 40 composed of about 0.1% to about 0.5% by weight molten $AgNO_3$ with a balance of molten $KNO_3$ was set at about 390° C. and immersion times from 30 to 60 minutes were successfully employed to incorporate appreciable concentrations of $Ag^+$ ions into the etched primary surfaces 12a of SLG articles 10.

Where the antimicrobial bath 40 includes a eutectic salt mixture, the temperature of the bath including the eutectic salt mixture may be about 300° C. or less (e.g., about 275° C. or less, about 250° C. or less, about 200° C. or less or in the range from about 200° C. to about 300° C., or from about 250° C. to about 300° C.). The bath including the eutectic salt mixture may include a concentration of $AgNO3$ in the range from about 0.1 weight percent to about 3 weight percent, from about 0.1 weight percent to about 2 weight percent, from about 0.1 weight percent to about 1 weight percent, from about 0.1 weight percent to about 0.9 weight percent, from about 0.1 weight percent to about 0.8 weight percent, from about 0.1 weight percent to about 0.7 weight percent, from about 0.1 weight percent to about 0.6 weight percent, from about 0.1 weight percent to about 0.5 weight percent, from about 0.3 weight percent to about 0.8 weight percent, from about 0.3 weight percent to about 0.6 weight percent, or from about 0.3 weight percent to about 0.5 weight percent. The duration of immersion in the bath including a eutectic salt mixture may be about 5 minutes to about 4 hours, from about 10 minutes to about 2 hours, from about 15 minutes to about 1 hour, from about 15 minutes to about 45 minutes, from about 20 minutes to about 40 minutes, or about 30 minutes.

When the antimicrobial bath 40 includes an aqueous solution, the solution may have a concentration of about 15 mols Ag/liter or less (e.g., about 12 mols Ag/liter or less, about 10 mols Ag/liter or less, about 9 mols Ag/liter or less, about 8 mols Ag/liter or less or about 7 mols Ag/liter or less). The temperature of the aqueous solution may be about 250° C. or less (e.g., about 225° C. or less, about 200° C. or less, about 175° C. or less, about 150° C. or less, about 140° C. or less, about 120° C. or less, about 100° C. or less, or about 90° C. or less). The duration of the immersion may be about 10 hours or greater, about 12 hours or greater, about 16 hours or greater, about 20 hours or greater, about 24 hours or greater, about 36 hours or greater, about 48 hours or greater, about 60 hours or greater, about 72 hours or greater, or about 84 hours or greater. The duration of immersion may be reduced by increasing the concentration of $AgNO_3$ and/or increasing the temperature of the solution.

Referring further to FIG. 1A, the method of making an antimicrobial SLG article 100a includes a step 140 for submersing the SLG article 10 into the antimicrobial bath 40 to exchange a plurality of silver metal ions from the antimicrobial bath 40 into the SLG substrate, to impart an antimicrobial property in the SLG article 10. Na+, K+, Li+ or a combination thereof may be exchanged for the antimicrobial agent. As a result, antimicrobial properties are developed within an antimicrobial agent-containing layer 28 within the SLG article 10. In some embodiments, the presence of the $KNO_3$ constituents in the bath 40 can help prevent a significant quantity of strength-enhancing $K^+$ ions from being removed from the compressive stress layer 24 and antimicrobial agent-containing layer 28 in the SLG article 10 during the submersion step 140.

In some embodiments of method 100a, the step 140 for submersing the SLG article 10 in the antimicrobial bath 40 is controlled for a duration of at least approximately 15 minutes, sufficient to incorporate antimicrobial-imparting ions (e.g., $Ag^+$ ions) into the glass article 10 for the desired antimicrobial properties. According to some embodiments, $Ag^+$ ions are imparted into the primary surface 12 or etched primary surfaces 12a of the glass article 10 at a concentration of about 1% to about 40% by weight (by weight % of $Ag_2O$) in step 140. In some cases, the concentration of $Ag^+$ ions at the etched primary surfaces 12a can slightly exceed 40%. In further embodiments, $Ag^+$ ions are imparted into the etched primary surfaces 12a of the SLG article 10 at a concentration of about 2%, 3%, 5%, 10%, 15%, 20%, 25%, 30%, 35%, or 40%. In certain implementations, step 140 can be controlled to produce a concentration of 6% to about 27%, about 25% to about 30% $Ag_2O$ by weight at the primary surface 12 or etched primary surfaces 12a. Further, the duration of the step 140 is controlled based on the composition and temperature of bath 40, the composition of the SLG article 10 and the desired antimicrobial properties associated with primary surface 12 and/or the etched primary surfaces 12a. In some embodiments, the duration of step 140 is controlled from about 15 minutes (e.g., about 20 minutes or greater, about 25 minutes or greater, about 30 minutes or greater, or about 35 minutes or greater) to about 10 hours. In other embodiments, the duration of step 140 is from about 15 minutes to about 90 minutes. In some additional embodiments of the method 100a, step 140 is controlled to a duration of about 30 minutes to about 60 minutes. In some additional embodiments, the step 140 is controlled to a duration of up to 4 days.

The method of making an antimicrobial SLG article 100a depicted in FIG. 1A can be advantageous in the sense that the material removal step, e.g., removing step 110, can be employed before the introduction of $Ag^+$ ions in subsequent steps. Accordingly, the $Ag^+$ ions incorporated into the glass article 10 during the submersion step 140 are not affected by the earlier removing step 110, thus preserving the Ag material incorporated into the articles. In some embodiments of the method 100a, submersion step 140 is configured to ensure that $Ag^+$ ions are imparted into the glass article 10 within the antimicrobial agent-containing layer 28 to a second depth 26. Second depth 26 can reach 1 µm, up to 2 µm, or even higher than 2 µm (e.g., up to 15 µm) in some cases, with a concentration profile indicative of a high concentration of $Ag^+$ ions (e.g., 1% to 40% by weight % of $Ag_2O$) at the primary surfaces 12a. In certain implementations, the depth 26 of the antimicrobial agent-containing layer is less than the first depth 22 of the CS layer 24.

After the submersion step 140 is completed according to the method 100a, a washing step 160 can be conducted to remove material from the bath 40 remaining on the surfaces of SLG article 10, including etched primary surfaces 12a. In some implementations, SLG articles 10 can be rinsed in an ammonium peroxide solution (e.g., 5% ammonium peroxide and 5% hydrogen peroxide) in step 160 conducted after the submersion step 140. Deionized water, for example, can also be used in the washing step 160 to remove material from the bath 40 on the surfaces of the SLG article 10. Other media may also be employed for washing the surfaces of the SLG article 10 provided that the media is selected to avoid any reactions with material from the bath 40 and/or the glass composition of the SLG article 10. At the end of washing step 160, the SLG articles 10 are sufficiently air dried or dried through other means that minimize contact with personnel and/or processing equipment.

Figure 1B:
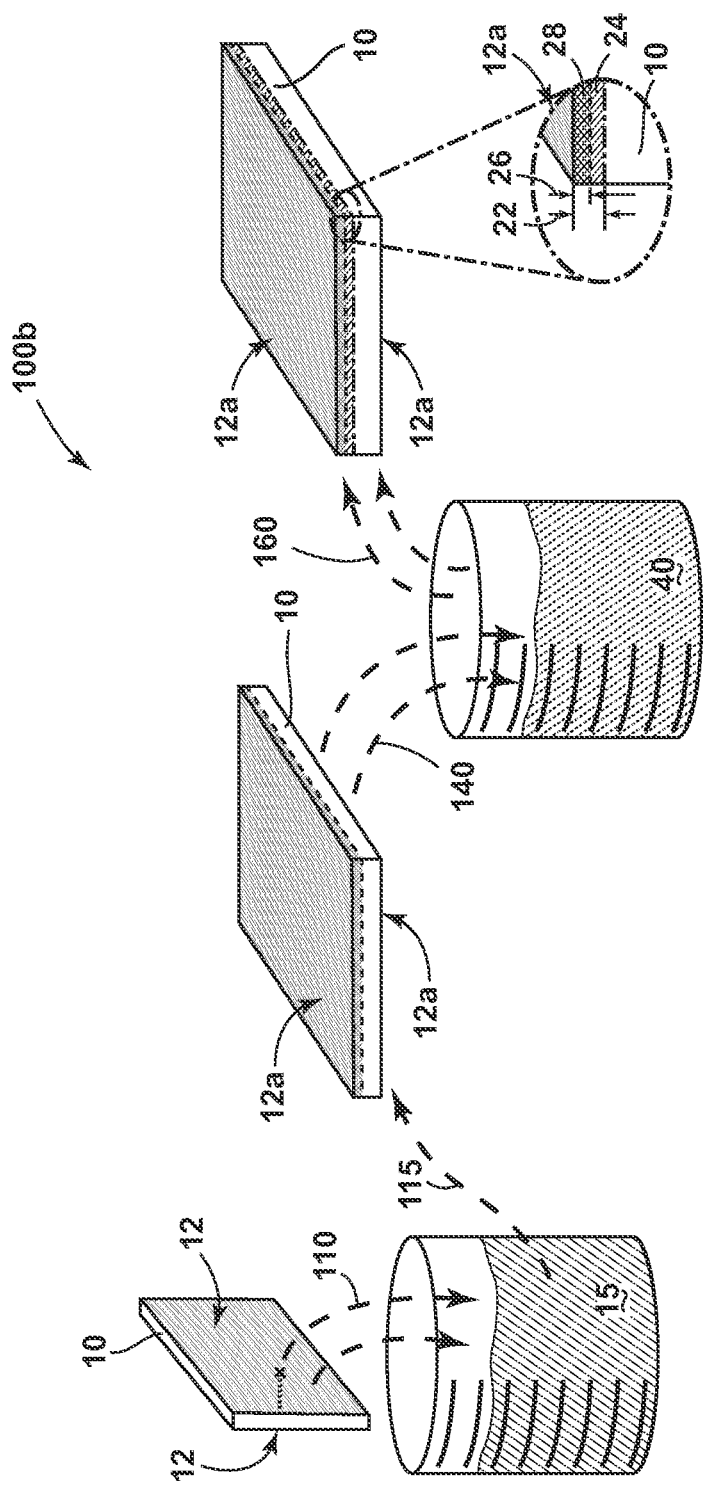
FIG. 1B is a schematic of a method of making an antimicrobial SLG article that is treated with a one-step ion exchange process according to an aspect of the disclosure.

Referring to FIG. 18, a method 100b of making an antimicrobial SLG article 10 is provided. The method 100b is largely identical to the method 100a; accordingly, like-numbered elements and steps have the same structure and/or function unless otherwise indicated as follows. Method 100b, however, employs a one-step ion exchange process to develop the compressive stress layer 24 and the antimicrobial agent-containing layer 28 in the SLG article 10. As such, the step 120 and bath 20 (see FIG. 1A) are not employed in the method 100b depicted in FIG. 1B. In step 140 of the method 100b, for example, the antimicrobial bath 40 can comprise about 0.1% to about 5% by weight molten $AgNO_3$ with a balance of molten $KNO_3$, $NaNO_3$ and/or $LiNO_3$. In an additional embodiment, the bath 40 possesses about 0.1%, 0.2%, 0.3% or about 0.4% by weight molten $AgNO_3$ with a balance of molten $KNO_3$. In step 140 of the method 100b, for example, the antimicrobial bath 40 can comprise $NaNO_3$, a combination of $KNO_3$ and $NaNO_3$, a eutectic salt mixture or an aqueous solution, as described above with respect to the antimicrobial bath 40 used in method 100a. In method 100b, when $KNO_3$ is utilized in the antimicrobial bath 40, the step 140 is used to simultaneously develop the compressive stress layer 24 and the antimicrobial agent-containing layer 28 within the SLG article 10. In some embodiments, the SLG substrate includes a compressive stress layer formed by thermal treatment and thus may not be further strengthened. For example, where additional strengthening (in addition to thermally-generated compressive stress layer) is not needed, an antimicrobial bath 40 including an aqueous solution or $NaNO_3$ but no $KNO_3$ may be used. In other embodiments, the SLG substrate may still be further strengthened using an antimicrobial bath 40 including $KNO_3$. In some embodiments, the SLG substrate may be heated prior to being immersed in the antimicrobial bath 40 (e.g., pre-heated to 200° C. for 20 to 45 minute, depending on substrate thickness).

Ultimately, methods 100a and 100b can be employed to develop antimicrobial SLG articles 10 that have low coloration or are colorless with excellent antimicrobial efficacy. In particular, SLG articles have been produced according to these methods with an $Ag_2O$ surface concentration of about 1-30 wt. % (or from about 6% to about 27%) by employing an antimicrobial bath 40 as described herein. These SLG articles have demonstrated antimicrobial efficacy in the Dry Test with log kill values of 2 or greater. As employed in some implementations of methods 100a and 100b, the material removal step 110 (i.e., the step that removed a portion of the primary surfaces 12 containing a high metallic ion concentration) helps ensure that these SLG articles do not discolor during the subsequent development of the antimicrobial agent-containing layer 28 in the submersion step 140. However, it should be understood that use of some of the antimicrobial baths 40 described in method 100a and method 100b may not result in discoloration even when the portion of the primary surfaces 12 is not removed. Specifically, use of an antimicrobial bath 40 including a eutectic salt mixture or an aqueous solution eliminates the need for the material removal step 110 and still provides an SLG article with substantially no discoloration. In some instances, use of an antimicrobial bath including a eutectic salt mixture results in increased strength as evidenced by improved average flexural strength, as measured by ring-on-ring testing.

It should be noted that between any of the above-described steps, the SLG articles 10, 10h can undergo a treatment in preparation for any of the subsequent steps. As described above, examples of such treatments include physical or chemical cleaning, physical or chemical etching, physical or chemical polishing, annealing, shaping, and/or the like.

Before or after the compressive stress layer(s) is formed, the antimicrobial agent-containing region is formed or both the compressive stress layer(s) and the antimicrobial agent-containing region are formed in the SLG articles, if desired, the optional additional layer(s) can be disposed on one or more primary surfaces 12 or etched primary surfaces 12a of the SLG substrates. Depending on the materials chosen, these coatings can be formed using a variety of techniques. For example, the optional additional layer(s) can be fabricated independently using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, or the like. Such processes are known to those skilled in the art to which this disclosure pertains.

Once the SLG articles 10, 10h are formed, they can be used in a variety of applications where the article will come into contact with undesirable microbes. These applications encompass touch-sensitive display screens or cover plates for various electronic devices (e.g., cellular phones, personal data assistants, computers, tablets, global positioning system navigation devices, and the like), non-touch-sensitive components of electronic devices, surfaces of household appliances (e.g., refrigerators, microwave ovens, stovetops, oven, dishwashers, washers, dryers, and the like), medical equipment, biological or medical packaging vessels, architectural components and applications (e.g., walls, elevators, counter tops, shower stalls, etc.) and vehicle components, just to name a few devices.

Given the breadth of potential uses for the improved antimicrobial SLG articles 10, 10h produced according to the methods 100a, and 100b, 100c and 100d described herein, it should be understood that the specific features or properties of a particular article will depend on the ultimate application therefor or use thereof. The following description, however, will provide some general considerations.

Figure 2:
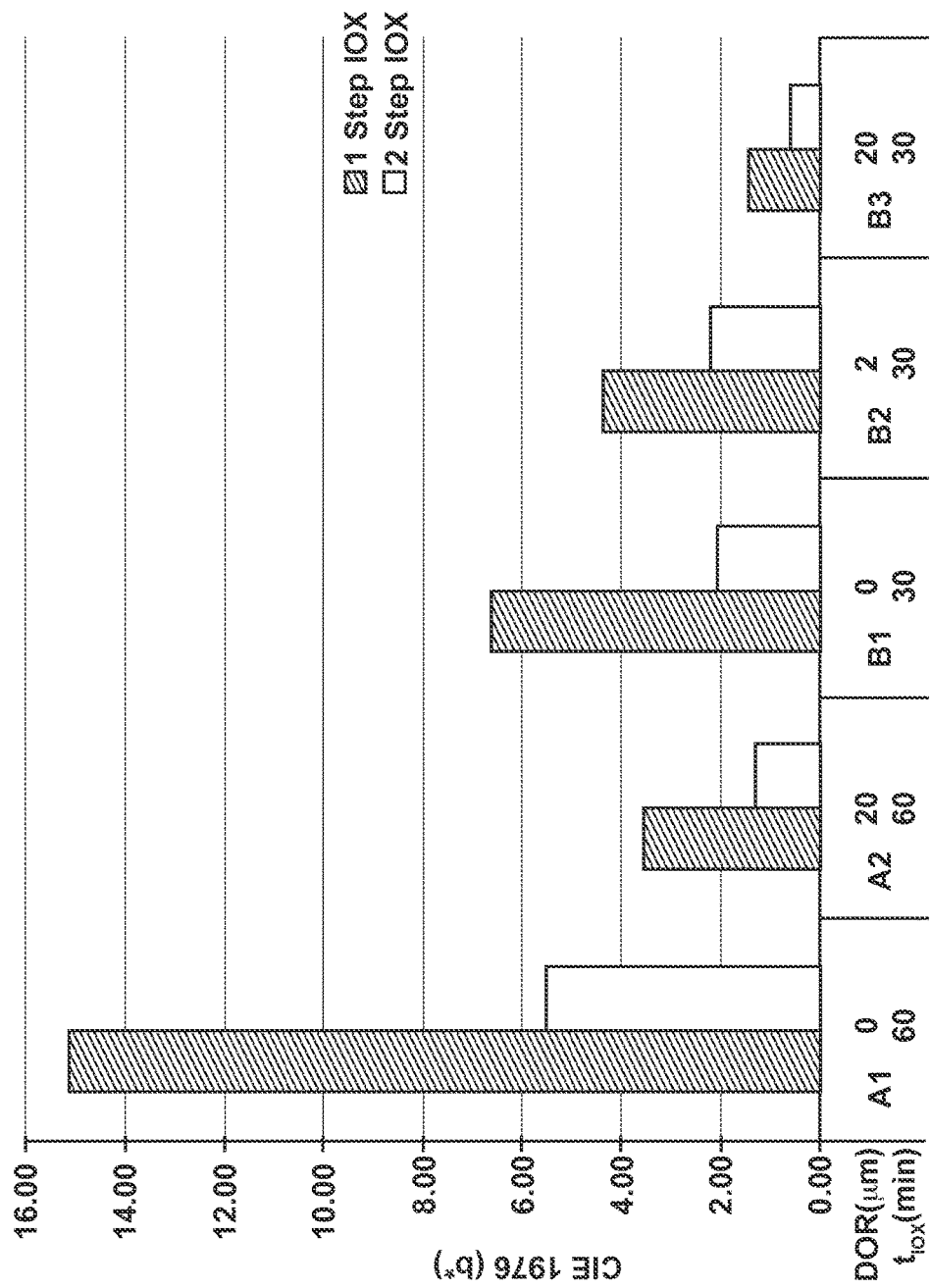
FIG. 2 is a bar chart depicting CIE 1976 color values (b*) for SLG articles treated with one- and two-step ion exchange processes according to an aspect of the disclosure.

Referring to FIG. 2, a bar chart is provided that depicts CIE 1976 color values (b*) for SLG articles formed using one- and two-step ion exchange processes according to an aspect of the disclosure. The data depicted in FIG. 2 was obtained from SLG articles (e.g., SLG articles 10) produced according to methods 100a and 100b. The shaded bars and open bars in FIG. 2 reflect SLG articles produced according to one-step and two-step ion exchange processes, respectively. The one-step ion exchange steps were conducted with 0.4 wt. % $AgNO_3$ and 99.6 wt. % $KNO_3$ at 390° C. The two-step ion exchange steps were conducted with 100% $KNO_3$ for 7 hours at 430° C., followed by immersion with 0.4 wt. % $AgNO_3$ and 99.6 wt. % $KNO_3$ at 390° C. The A1 and A2 groups and the B1, B2 and B3 groups are indicative of a total antimicrobial immersion time of 60 minutes and 30 minutes (e.g., during step 140 in FIGS. 1A and 1B), respectively. The A1 and B1 groups were not subjected to any material removal process (e.g., step 110 in FIGS. 1A and 1B) before development of the compressive stress and antimicrobial agent-containing layers. The A2 and B3 groups were subjected to a material removal process with a DOR of 20 μm and the B2 group was subjected to a material removal process with a DOR of 2 μm.

As shown in FIG. 2, increasing levels of material removal for both one-step and two-step processing conditions result in decreasing CIE 1976 b* coloration levels. For example, a DOR of 20 μm reduced the CIE 1976 b* coloration level by about 5× compared to a no-DOR condition in SLG articles processed with a 30 minute one-step ion exchange immersion process. It is believed that the removal of the $Sn^2$ ions at the primary surfaces of the SLG articles led to the reduced coloration levels observed in FIG. 2 as these ions were not available to react and precipitate out as Ag crystals during the subsequent antimicrobial immersion step. Similarly, CIE 1976 b* coloration levels were reduced by about 3× for SLG articles having a DOR of 20 μm compared to a no-DOR condition that were produced with a two-step ion exchange immersion process.

Figure 3:
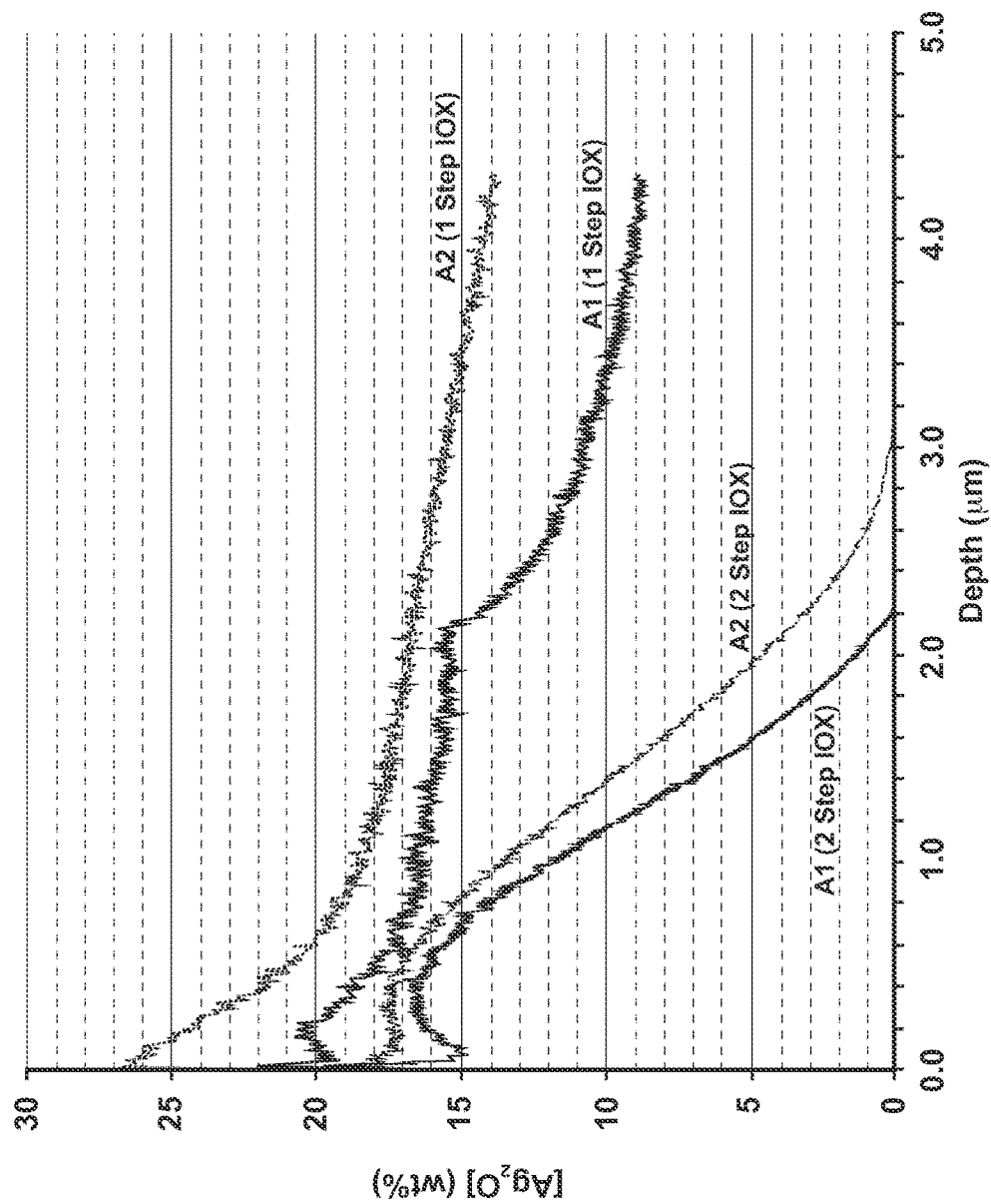
FIG. 3 is a chart depicting the concentration of an antimicrobial agent ($Ag_2O$) as a function of depth (μm) in SLG articles treated with one- and two-step ion exchange processes according to an aspect of the disclosure.

Referring to FIG. 3, a chart is provided that depicts the measured concentration (using SIMS) of an antimicrobial agent [$Ag_2O$ (wt. %)] as a function of depth (μm) in SLG articles chemically strengthened with one- and two-step ion exchange processes according to an aspect of the disclosure. The data depicted in FIG. 3 was obtained from SLG articles produced according to methods 100a and 100b. More specifically, the one-step ion exchange steps were conducted with 0.4 wt. % $AgNO_3$ and 99.6 wt. % $KNO_3$ at 390° C. for an immersion time of 60 minutes. The two-step ion exchange steps were conducted with 100% $KNO_3$ for 7 hours at 430° C., followed by immersion with 0.4 wt. % $AgNO_3$ and 99.6 wt. % $KNO_3$ at 390° C. for 60 minutes. The A1 groups (e.g., SLG articles subjected to 1-step and 2-step ion exchange processes) were not subjected to any material removal process before the ion exchange process steps. The A2 groups were subjected to a material removal process with a DOR of 20 μm (e.g., SLG articles later subjected to 1-step and 2-step ion exchange processes).

As shown in FIG. 3, $Ag_2O$ surface concentrations of about 26 wt. % and about 19 wt. % were obtained in one-step and two-step SLG samples (i.e., the A2 group) subjected to a 20 μm DOR material process step, respectively. The SLG samples not subjected to a material removal process (i.e., the A1 group) exhibited $Ag_2O$ surface concentration levels slightly lower than those samples subjected to a 20 μm DOR. As such, it is believed that the tin removal step enhances the development of the antimicrobial agent-containing layer by facilitating the development of higher concentrations of $Ag^+$ ions. Further, FIG. 3 demonstrates that higher concentrations of $Ag^+$ ions can be obtained at the surfaces of the SLG articles subjected to a one-step ion exchange process with an antimicrobial immersion step employing a bath having 0.4 wt. % $AgNO_3$ and 99.6 wt. % $KNO_3$ at 390° C. with an immersion time of 60 minutes. Finally, it is apparent from the data in FIG. 3 that the SLG samples processed with two-step and one-step ion exchange processes obtained an antimicrobial agent-containing layer having a depth of at least 2 μm and 4 μm (e.g., a depth 26 of the SLG articles 10 shown in FIGS. 1A and 1B), respectively.

Figure 4:
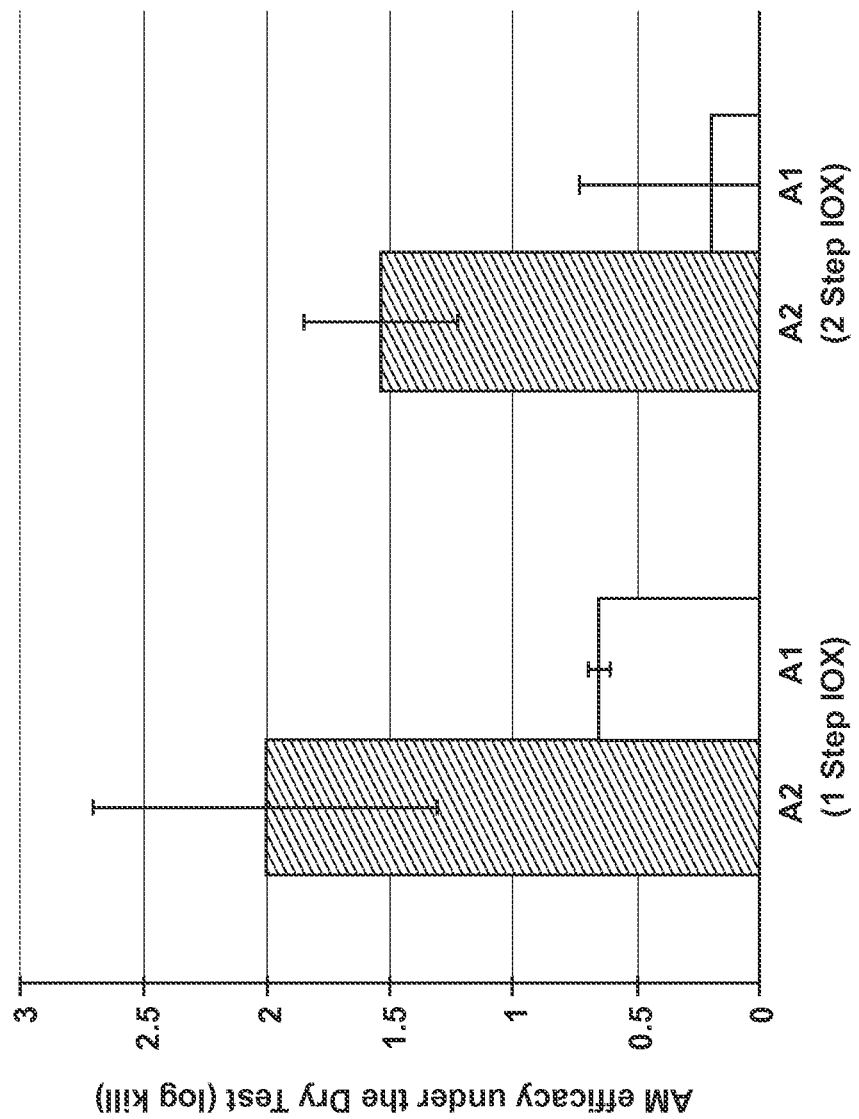
FIG. 4 is a bar chart depicting antimicrobial efficacy according to the Dry Test for SLG articles treated with one- and two-step ion exchange processes according to an aspect of the disclosure.

Referring now to FIG. 4, a bar chart is provided according to an aspect of the disclosure that depicts the antimicrobial efficacy according to the Dry Test for SLG articles treated with one- and two-step ion exchange processes. The A1 and A2 groups of samples shown in FIG. 4 correspond to the same antimicrobial SLG article conditions as the like-named samples employed in the testing depicted in FIG. 3. The SLG samples not subjected to any material removal step (i.e., the A1 group) exhibited log kill values of less than 1. In contrast, the SLG samples subjected to a 20 μm DOR material process step exhibited log kill values approaching or exceeding 2. In view of the data shown in FIG. 4, the material removal process step 110 associated with methods 100a and 100b (see FIGS. 1A and 1B) can also improve the antimicrobial efficacy of the SLG articles, in addition to minimizing or eliminating discoloration associated with the development of the antimicrobial agent-containing layer (see FIG. 2 and corresponding description).

It also appears from FIG. 4 that the SLG articles processed with a one-step ion exchange process exhibited slightly higher log kill values in the Dry Test compared to the samples processed with a two-step ion exchange process. These results are likely indicative of the higher $Ag^+$ ion surface concentrations observed in the samples produced with a one-step ion exchange process compared to the samples produced with a two-step ion exchange process (see FIG. 3 and corresponding description).

Figure 5A:
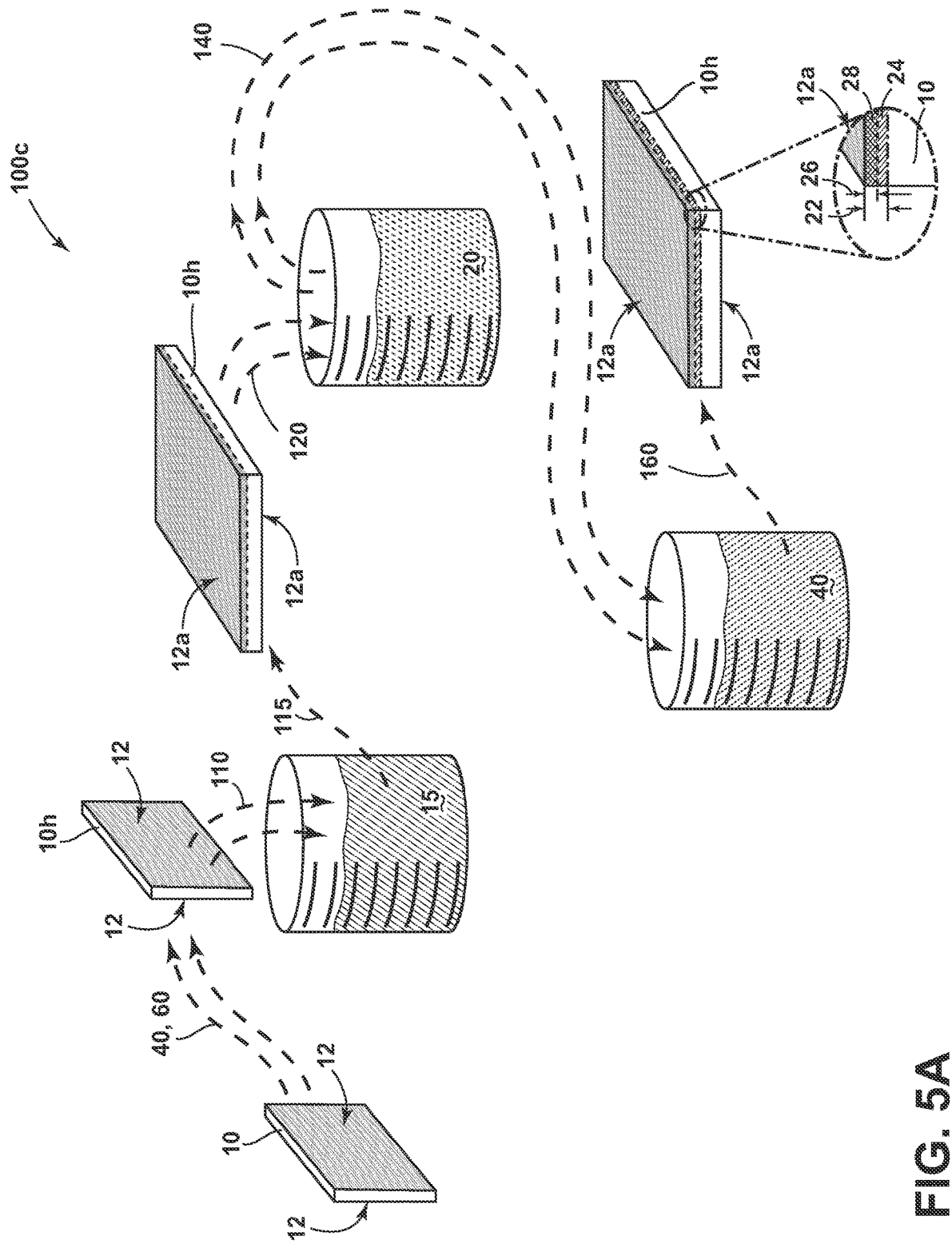
FIG. 5A is a schematic of a method of making a heat-treated antimicrobial SLG article that is treated with a two-step ion exchange process according to an aspect of the disclosure.
Figure 5B:
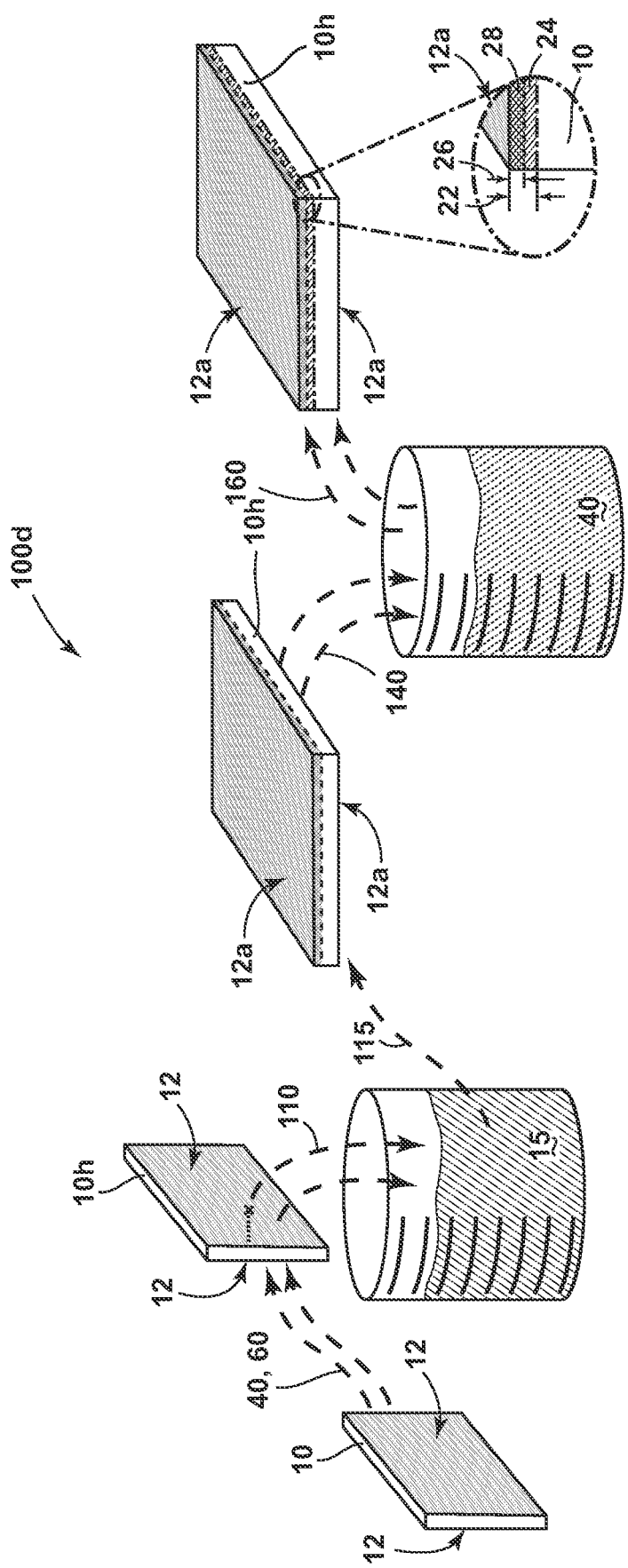
FIG. 5B is a schematic of a method of making a heat-treated antimicrobial SLG article that is treated with a one-step ion exchange process according to an aspect of the disclosure.

Referring now to FIGS. 5A and 5B, methods 100c and 100d, respectively, are depicted in schematic form for making antimicrobial SLG articles 10h. The methods 100c and 100d are largely identical to the methods 100a and 100b, respectively; accordingly, like-numbered elements and steps have the same structure and/or function unless otherwise indicated as follows. In methods 100c and 100d, however, SLG articles 10 are subjected to heat treatments steps 40 and/or 60 to strengthen the articles and place them into a heat-treated form as heat-treated SLG articles 10h. In the methods 100c and 100d, as depicted in FIGS. 5A and 5B, the heat treatment steps 40 and/or 60 are conducted prior to the material removal step (as employed in some embodiments) 110 and the steps for developing the compressive stress layer 24 and antimicrobial agent-containing layer 28 (i.e., steps 120 and/or 140). In some implementations, the heat treatment steps 40 and/or 60 can be conducted after the material removal step 110, and before the steps for developing the compressive stress and antimicrobial agent-containing layers 24 and 28, respectively.

In step 40, the SLG articles 10 are annealed in a furnace. In one implementation, step 40 is conducted at about 550° C. and then the articles 10 are slowly cooled to ambient temperature (e.g., by furnace cooling without cooling assistance). In certain implementations of the methods 100c and 100d depicted in FIGS. 5A and 5B, an optional tempering step 60 can also be conducted on the SLG articles 10. Tempering step 60 can be conducted by heating the SLG article 10 to about 700° C. for a few minutes, and then rapidly cooling the article by directing air at a high velocity and/or pressure against it. In some cases, the additional tempering step 60 can improve the strength of annealed SLG articles 10 by a factor of four or five.

In effect, the fast cooling rate associated with tempering step 60 can lead to stored strain energy in the SLG article. Upon breakage, a tempered SLG article 10h will generally shatter in many small, harmless fragments. As such, tempered antimicrobial SLG articles 10h are suitable for numerous applications requiring glass safety such as in automobiles, architecture (e.g., windows), appliances (e.g., refrigerator shelves), eye wear, etc.

As conducted in steps 100c and 100d, the heat treatment steps 40 and/or 60 can also provide a benefit in terms developing a more open microstructure in the SLG articles 10h that is more conducive to the development of the compressive stress and antimicrobial agent-containing layers 24 and 28, respectively. For example, $Ag^+$ ion diffusion rates appear to be higher in heat-treated SLG articles 10h compared to SLG articles not subjected to any heat treatment before ion exchange processes. As such, shorter ion exchange immersion times can be employed in SLG articles 10h to develop the compressive stress and antimicrobial agent-containing layers 24 and 28 compared to the development of these layers in SLG articles 10 not subjected to any prior heat treatment.

Figure 6:
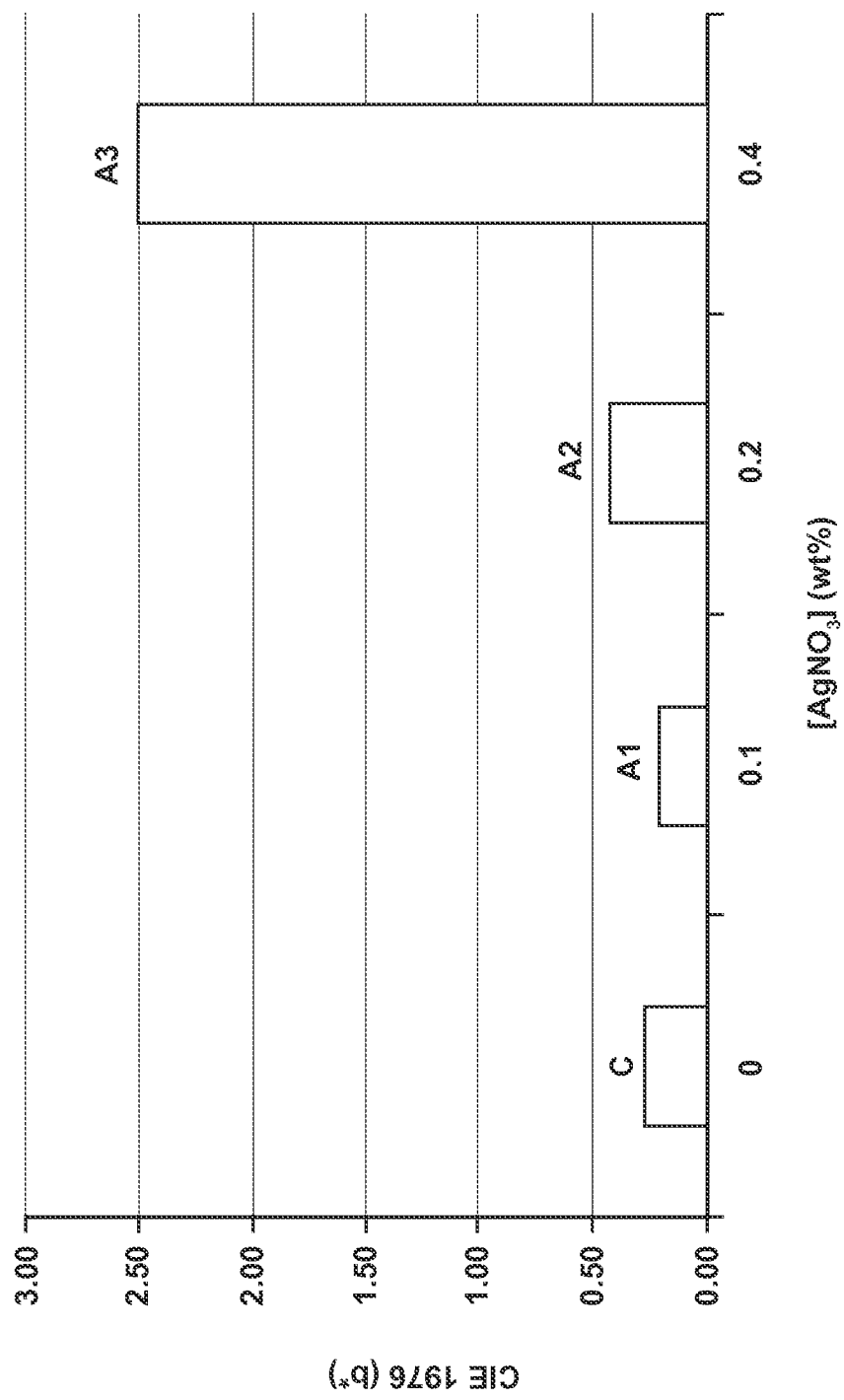
FIG. 6 is a bar chart depicting CIE 1976 color values (b*) for heat-treated SLG articles treated with a one-step ion exchange process according to varying concentrations of $AgNO_3$ according to an aspect of the disclosure.

Referring to FIG. 6, a bar chart is provided that depicts CIE 1976 color values (b*) for heat-treated SLG articles treated with a one-step ion exchange process with varying concentrations of $AgNO_3$ according to an aspect of the disclosure. In FIG. 6, the C group of data corresponds to a set of tempered SLG articles (e.g., SLG articles 10) that have not been subjected to any ion exchange processes for developing compressive stress and antimicrobial agent-containing layers. The A1, A2, and A3 groups of data correspond to tempered SLG articles that have been subjected to a 30 μm material removal step and a one-step ion exchange process using a molten salt bath with 0.1 wt. %, 0.2 wt. % or 0.4 wt. % $AgNO_3$ and a balance of $KNO_3$, respectively. As demonstrated by FIG. 6, the tempered SLG articles with an antimicrobial agent-containing layer developed with 0.1 wt. % or 0.2 wt. % $AgNO_3$ molten salt bath (i.e., sample groups A1 and A2) exhibit CIE 1976 b* coloration levels below 0.5 comparable to the as-received tempered SLG articles containing no antimicrobial agent-containing layer (i.e., sample group C). It is also apparent from FIG. 6 that the tempered SLG articles with an antimicrobial agent-containing layer developed with a 0.4 wt. % $AgNO_3$ molten salt bath exhibit a low level of coloration, as evidenced by a CIE 1976 b* value that approaches 2.5.

Figure 7A:
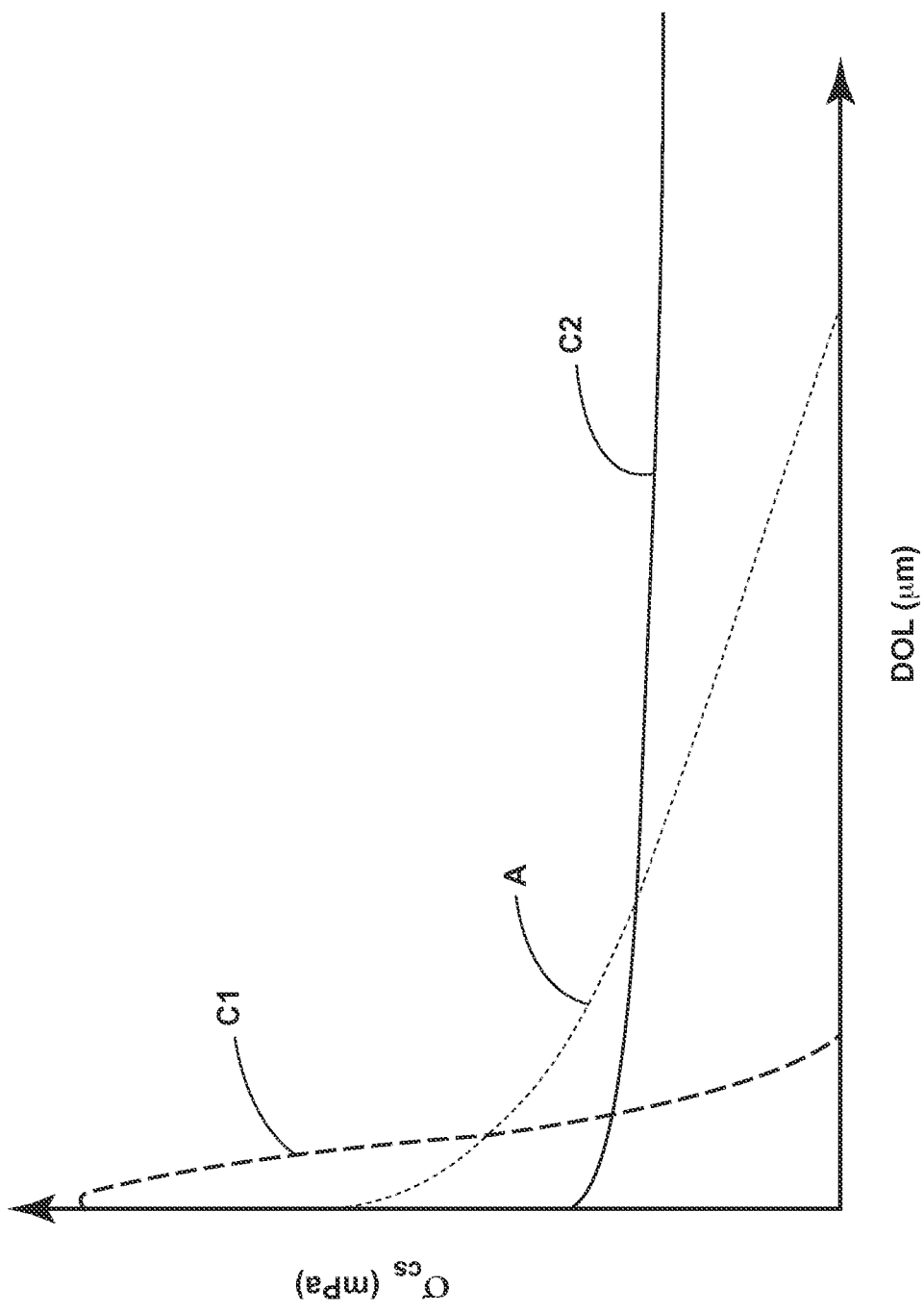
FIG. 7A is a schematic depicting the compressive stress profile at and below the surface of treated SLG articles subjected to heat-treatments and/or ion-exchange processes.

Referring to FIG. 7A, a schematic is provided that depicts a modeled compressive stress profile at and below the surface of strengthened SLG articles subjected to heat-treatments and/or chemical strengthening processes. In FIG. 7A, the C1 sample group is indicative of the CS profile as a function of depth for SLG articles subjected to a strength-enhancing ion exchange process and no heat treatments prior to the one-step or two-step ion exchange process (e.g., SLG articles 10 produced by methods 100a or 100b in FIGS. 1A and 1B). The C2 sample group, in contrast, is indicative of the CS profile as a function of depth for SLG articles subjected to heat treatments, but no further ion exchange processes. Finally, the A sample group is indicative of the CS profile as a function of depth for SLG articles subjected to a strength-enhancing ion exchange process and heat treatments prior to the one-step or two-step ion exchange process (e.g., SLG articles 10h produced by methods 100c or 100d in FIGS. 5A and 5B).

As demonstrated by FIG. 7A, the addition of the heat treatment steps in the processing of the A group of articles before ion exchange processing, as compared to the C1 group, tends to increase the DOL associated with the CS layer while reducing the level of compressive stress at the surface of the article. As noted earlier, it is believed that the heat treatment steps can lead to a more open microstructure in the SLG article, thus enhancing diffusion during ion exchange processing, manifested in higher DOL values and reduced surface compressive stress levels. FIG. 7A also demonstrates that the ion exchange process employed in the A group of articles tends to produce higher compressive stress levels at the surface compared to the C2 group without any ion exchange processing. As such, the combination of ion exchange and heat treatment process steps indicative of the A group provides a good balance of high surface compressive stress and appreciable DOL values.

Figure 7B:
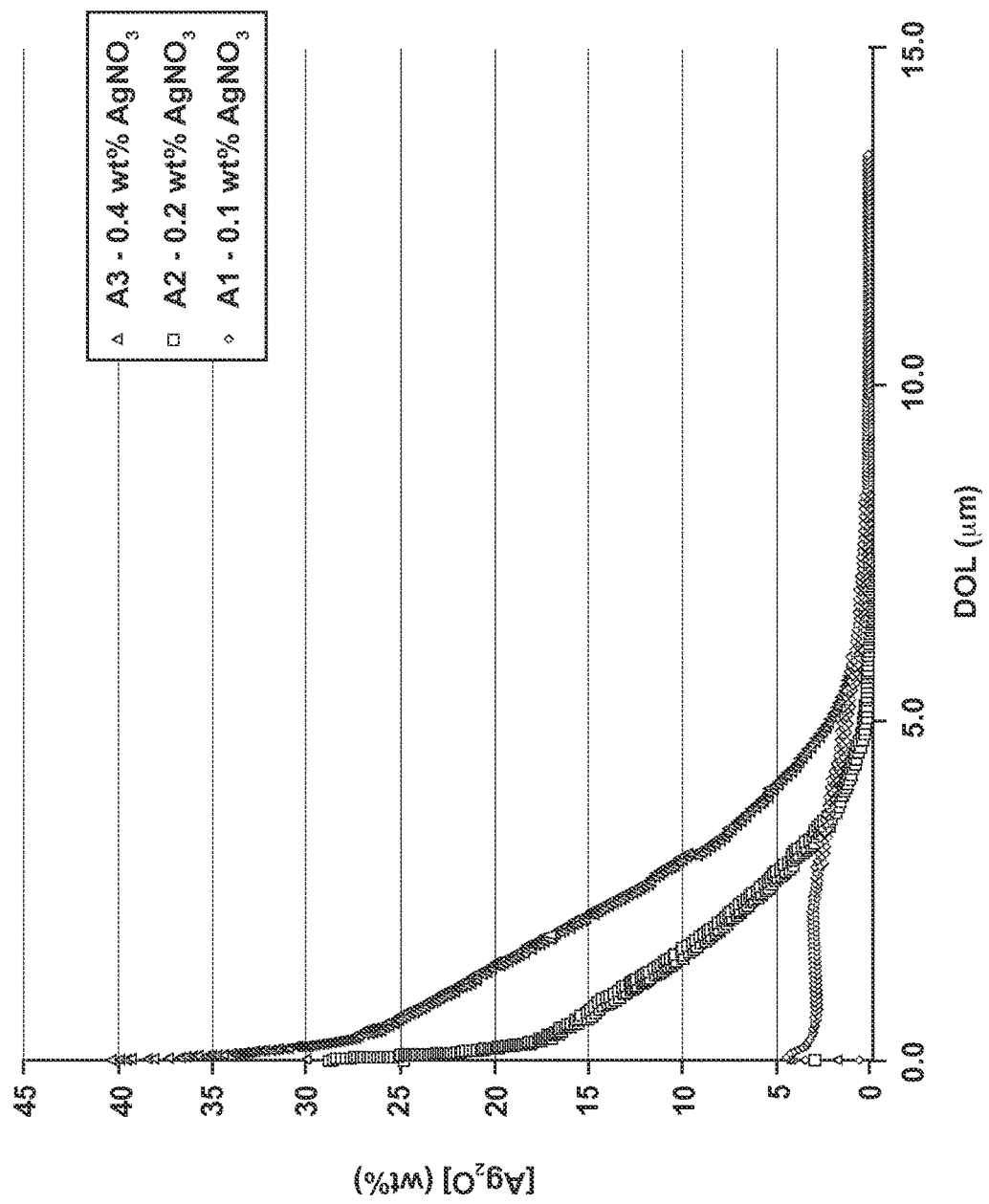
FIG. 7B is a chart depicting the concentration of an antimicrobial agent ($Ag_2O$) as a function of depth in heat-treated SLG articles treated in a one-step ion exchange process according to varying concentrations of $AgNO_3$ according to an aspect of the disclosure.

In FIG. 7B, a chart depicts the measured concentration (using to SIMS) of an antimicrobial agent ($Ag_2O$) as a function of depth in heat-treated SLG articles chemically strengthened in a one-step ion exchange process with varying concentrations of $AgNO_3$ according to an aspect of the disclosure. The SLG samples employed to generate the A1, A2 and A3 groups of data depicted in FIG. 7B all were subjected to a tempering and material removal process steps (e.g., steps 40, 60 and 110 of methods 100c and 100d shown in FIGS. 5A and 5B). In particular, the A1, A2, and A3 groups of data correspond to tempered SLG articles that have been subjected to a 30 μm material removal step and a one-step ion exchange process using a molten salt bath with 0.1 wt. %, 0.2 wt. % or 0.4 wt. % $AgNO_3$ and a balance of $KNO_3$, respectively. As demonstrated by FIG. 7B, the A1, A2 and A3 groups of samples exhibited antimicrobial agent surface concentration levels approaching 40 wt. %, 30 wt. % and 5 wt. % $Ag_2O$, respectively, and DOR levels exceeding 5 μm. It is also apparent from FIGS. 6 and 7B that employing a molten salt bath containing 0.2 wt. % $AgNO_3$ and a balance of $KNO_3$ in tempered SLG articles can drop the surface concentration of $Ag^+$ ions by about 10 wt. % and improve discoloration by at least a factor of 5 compared to tempered SLG articles fabricated with a molten salt bath containing 0.4 wt. % $AgNO_3$ and a balance of $KNO_3$.

Figure 8A:
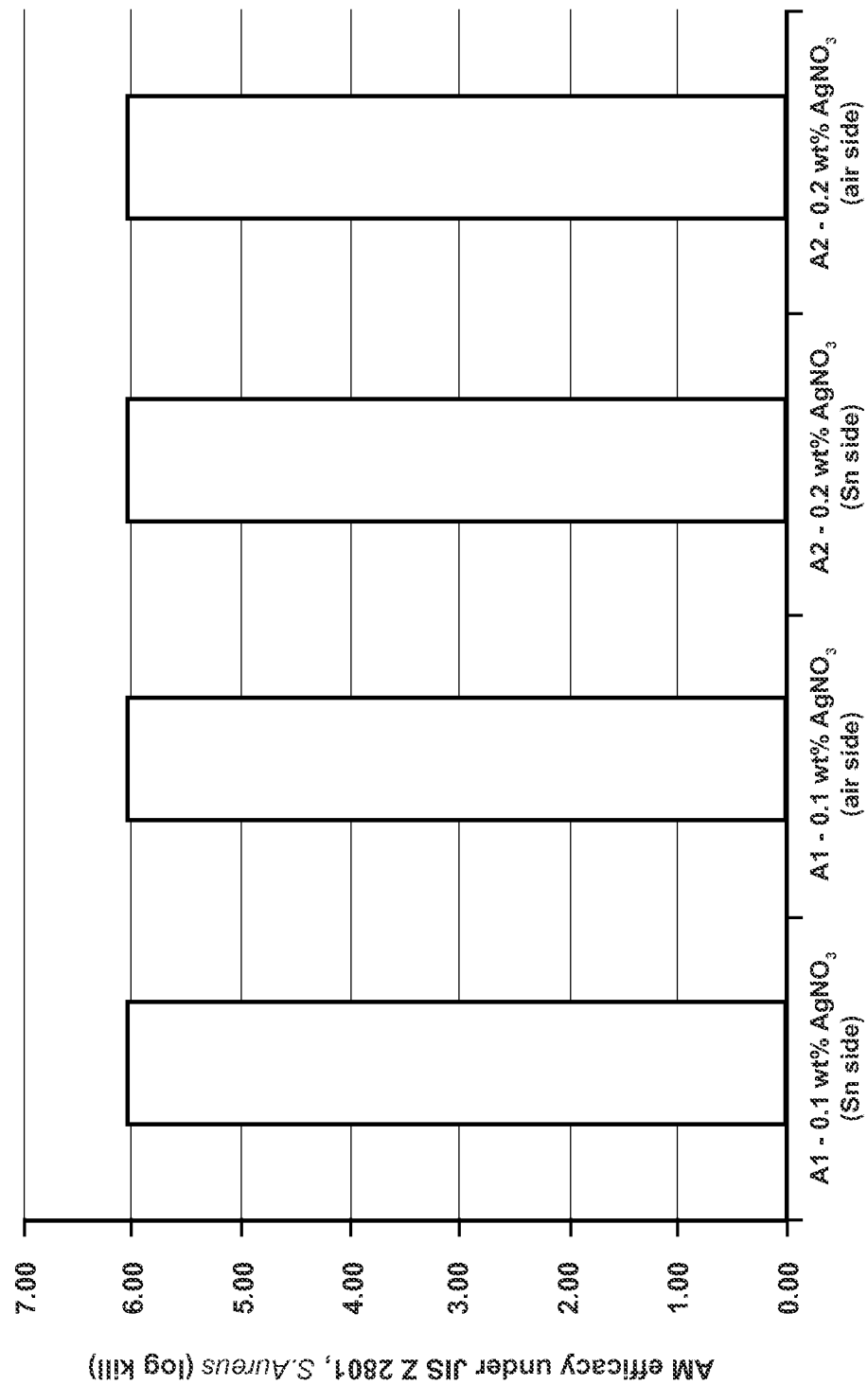
FIG. 8A is a bar chart depicting antimicrobial efficacy according to the JIS Z 2801 (2000) test with S. Aureus bacteria for heat-treated SLG articles treated with a one-step ion exchange process according to an aspect of the disclosure.
Figure 8B:
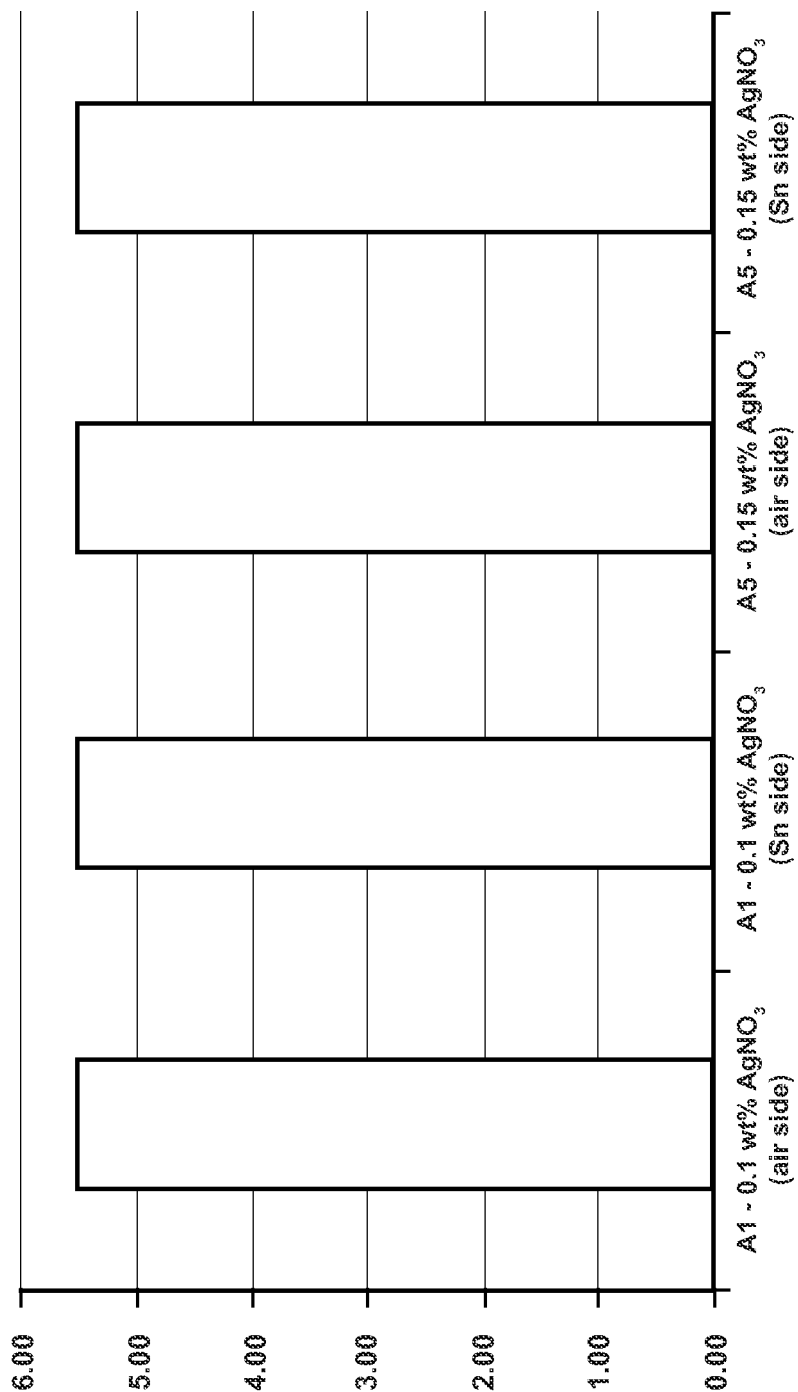
FIG. 8B is a bar chart depicting antimicrobial efficacy according to the JIS Z 2801 (2000) test at 4° C. with E. Coli bacteria for heat-treated SLG articles treated with a one-step ion exchange process according to an aspect of the disclosure.

Referring to FIGS. 8A and 8B, bar charts depict antimicrobial efficacy according to the JIS Z 2801 (2000) test with *S. Aureus* bacteria and the JIS Z 2801 (2000) test at 4° C. with *E. Coli* bacteria, respectively, for heat-treated SLG articles chemically strengthened with a one-step ion exchange process according to an aspect of the disclosure. In FIG. 8A, tempered SLG articles that were ion exchanged in a molten salt bath containing 0.1 wt. % or 0.2 wt. % $AgNO_3$ and a balance of $KNO_3$ were demonstrated to exhibit log kill values of about 6 or greater in the JIS Z 2801 (2000) antimicrobial efficacy test employing *S. Aureus* bacteria. Similarly, in FIG. 8B, tempered SLG articles that were ion exchanged in a molten salt bath containing 0.1 wt. % or 0.15 wt. % $AgNO_3$ and a balance of $KNO_3$ were demonstrated to exhibit log kill values of about 5 or greater in the JIS Z 2801 (2000) antimicrobial efficacy test at 4° C. employing *E. Coli* bacteria. The results in FIGS. 8A and 8B make clear that relatively low concentration antimicrobial agent-containing immersion baths (e.g., molten salt baths with about 0.1 to 0.2 wt. % $AgNO_3$ and a balance of $KNO_3$) can be used to develop antimicrobial agent-containing layers in tempered SLG articles that exhibit high antimicrobial efficacy. Advantageously, these tempered antimicrobial SLG articles also exhibit low discoloration levels or are colorless (see FIG. 6, sample groups A1 and A2).

Figure 9:
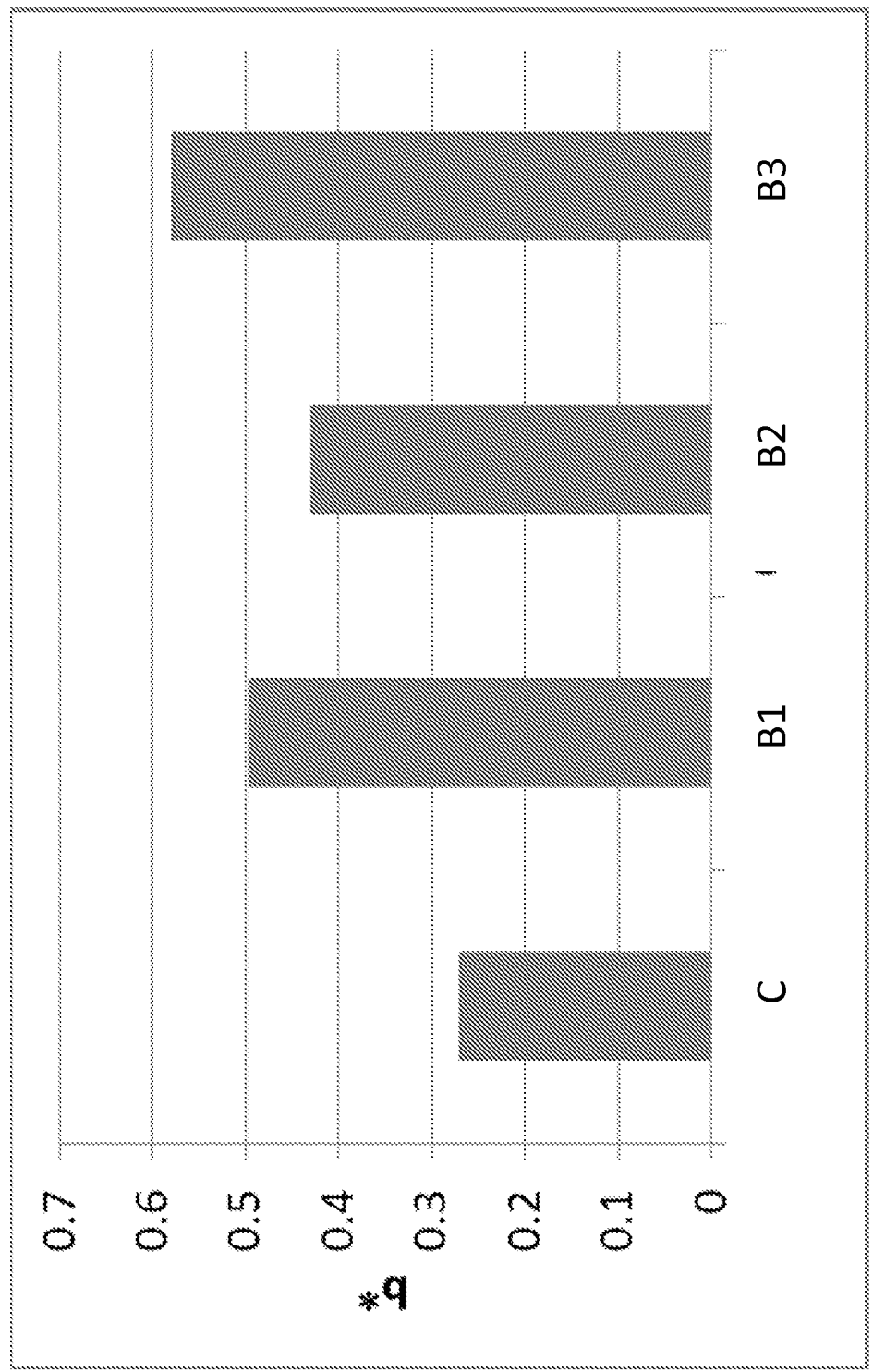
FIG. 9 is a bar chart depicting CIE 1976 color values (b*) for heat-treated SLG articles subjected to a one-step ion exchange process including a antimicrobial bath with varying concentrations of $AgNO_3$ and a eutectic salt mixture of $KNO_3$ and $NaNO_3$, according to an aspect of the disclosure.

FIG. 9 is a bar chart showing CIE 1976 color values (b*) of heat-treated SLG articles that formed using a one-step ion exchange process including an antimicrobial bath of a eutectic salt mixture of $KNO_3$ and $NaNO_3$ and either 0.1 weight percent, 0.3 weight percent or 0.5 weight percent $AgNO_3$. In FIG. 9, C corresponds to a tempered SLG article (e.g., SLG articles 10) that has not been subjected to any ion exchange processes for developing compressive stress and antimicrobial agent-containing layers. B1, B2, and B3 correspond to tempered SLG articles that have been subjected to a one-step ion exchange process using a molten salt bath with 0.1 wt. %, 0.3 wt. % or 0.5 wt. % $AgNO_3$ and a balance of a eutectic salt mixture of $KNO_3$ and $NaNO_3$, respectively. B1 was formed by immersing the tempered SLG article in an antimicrobial bath having a temperature of 300° C. for 30 minutes. B2 was formed by immersing the tempered SLG article in an antimicrobial bath having a temperature of 250° C. for 45 minutes. B3 was formed by immersing the tempered SLG article in an antimicrobial bath having a temperature of 250° C. for 30 minutes. There was no material removal step performed on C, B1, B2 and B3 (i.e., the primary surface 12 of each of C, B1, B2 and B3 included tin). As demonstrated by FIG. 9, the tempered SLG articles with an antimicrobial agent-containing layer developed with 0.1 wt. %, 0.3 wt. % $AgNO_3$ molten salt bath (i.e., sample groups B1 and B2) exhibit CIE 1976 b* coloration levels below 0.5 comparable to the as-received tempered SLG articles containing no antimicrobial agent-containing layer (i.e., sample group C). It is also apparent from FIG. 9 that the tempered SLG articles with an antimicrobial agent-containing layer developed with a 0.5 wt. % $AgNO_3$ molten salt bath (B3) exhibit a low level of coloration, as evidenced by a CIE 1976 b* value that is less than 0.6.

Figure 10:
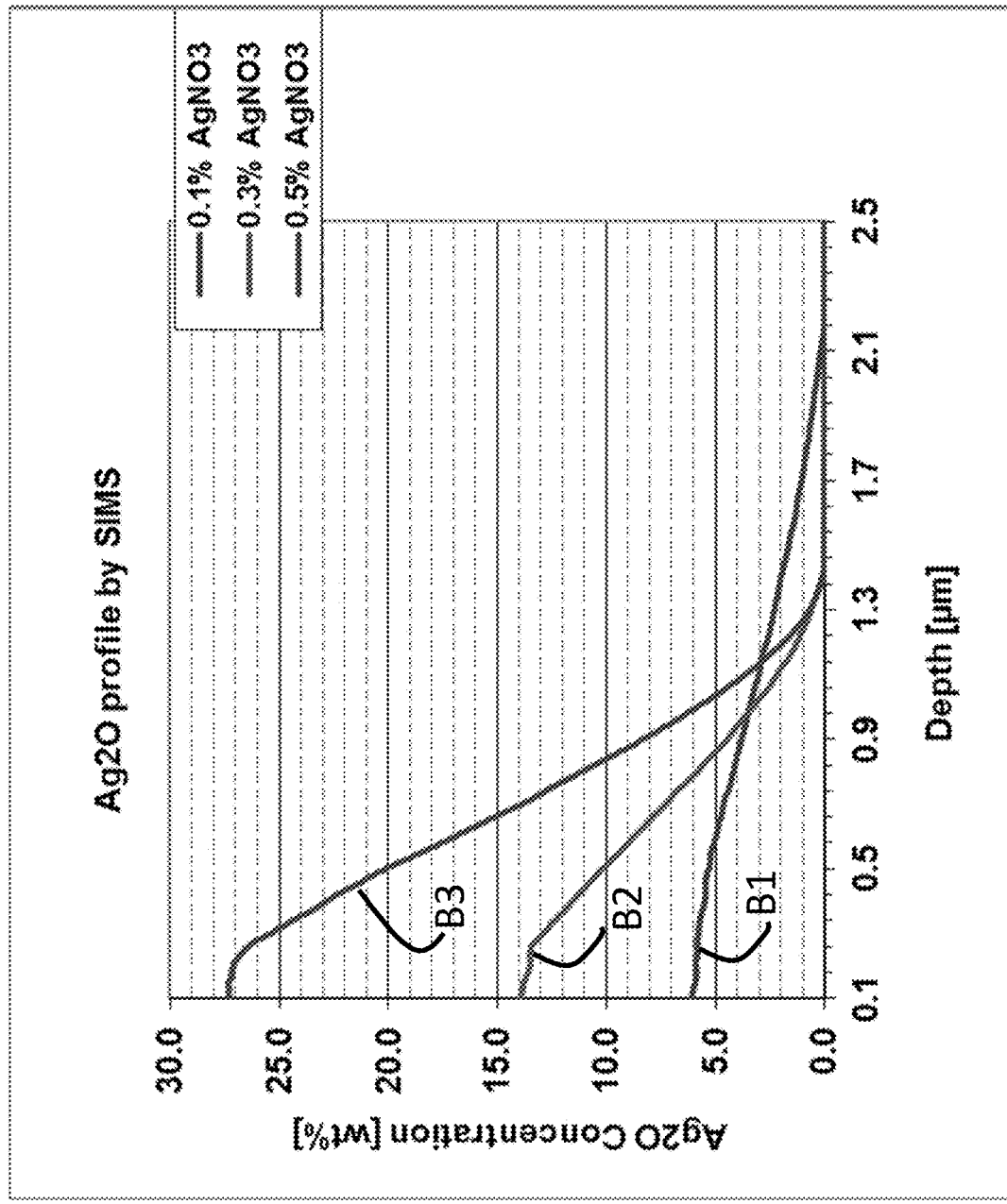
FIG. 10 is a chart depicting the concentration of an antimicrobial agent ($Ag_2O$) as a function of depth in heat-treated SLG articles treated in a one-step ion exchange process according to varying concentrations of AgNO$_3$ according to an aspect of the disclosure.

FIG. 10 shows an $Ag_2O$ concentration (wt %) profile as a function of depth of B1, B2, and B3 shown in FIG. 9. The data shown in FIG. 10 was measured using secondary ion mass spectrometry (SIMS) microscopy. B1 (formed by immersing the SLG article in an antimicrobial bath of 0.1 wt % $AgNO_3$ and a eutectic salt mixture of $KNO_3$ and $NaNO_3$ having a temperature of 300 C for 30 minutes) exhibited the deepest silver diffusion. The profile shown in FIG. 10 indicates that the bath temperature may drive silver diffusion depth (i.e., a higher temperature bath may provide deeper silver diffusion).

Figure 11:
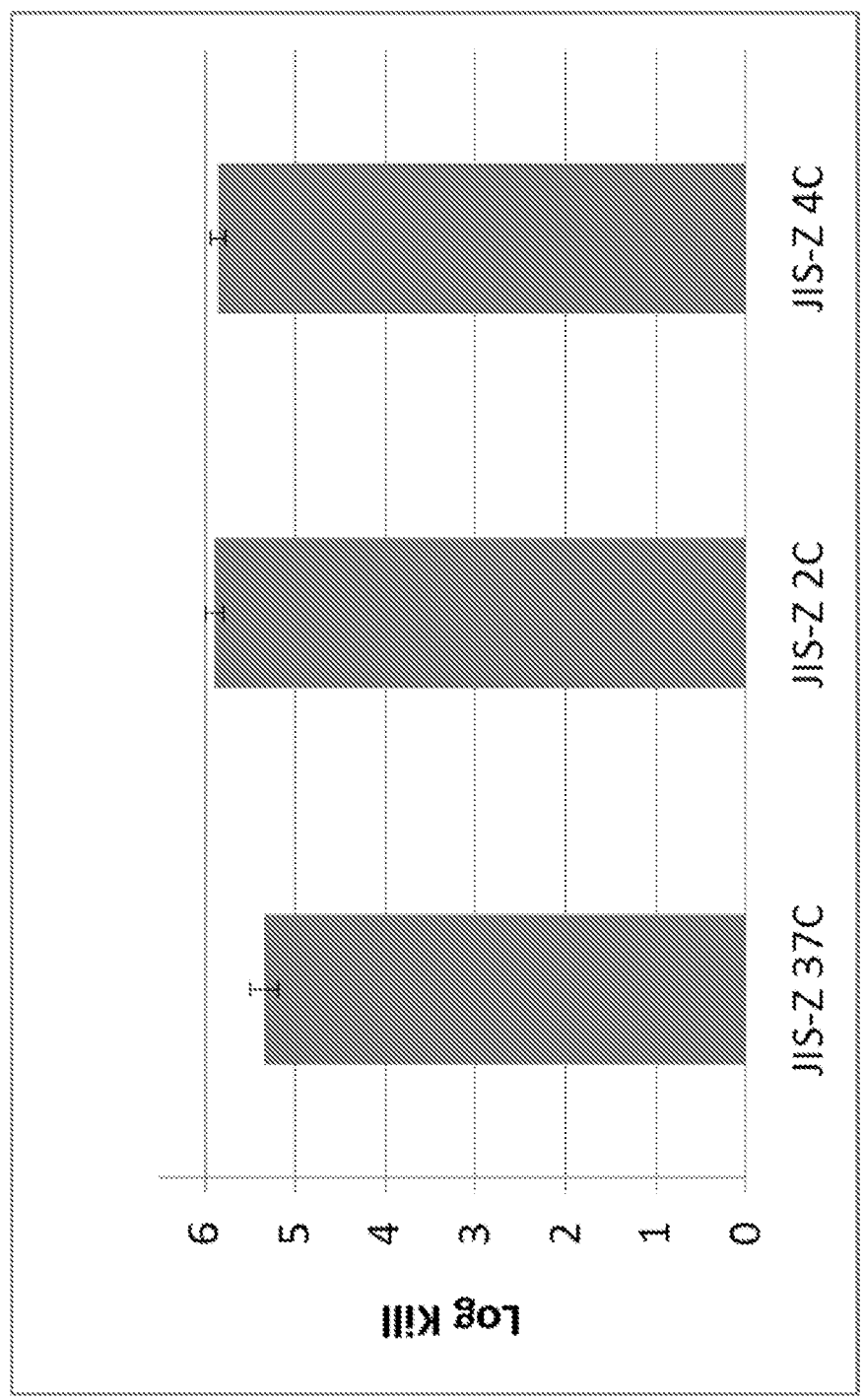
FIG. 11 is a bar chart depicting antimicrobial efficacy according to the JIS Z 2801 (2000) test with *S. Aureus* bacteria and according to the JIS Z 2801 (2000) test with *E. coli* bacteria at 2° C. and 4° C., for heat-treated SLG articles subjected to a one-step ion exchange process according to an aspect of the disclosure.

FIG. 11 shows a bar chart depicting antimicrobial efficacy according to the JIS Z 2801 (2000) test with *S. Aureus* bacteria and the JIS Z 2801 (2000) test at 2° C. and 4° C. with *E. Coli* bacteria, respectively, for heat-treated SLG articles chemically strengthened with a one-step ion exchange process according to an aspect of the disclosure. In FIG. 11, the tempered antimicrobial SLG article of B3, shown in FIG. 9 demonstrated log kill values of about 5 or greater in the JIS Z 2801 (2000) antimicrobial efficacy test employing *S. Aureus* bacteria and the JIS Z 2801 (2000) test at 2° C. and 4° C. with *E. Coli* bacteria. The results in FIG. 11 make clear that relatively low concentration antimicrobial agent-containing immersion baths (e.g., molten salt baths with about 0.5 wt. % $AgNO_3$ and a balance of a eutectic salt mixture $KNO_3$ and $NaNO_3$) can be used to develop antimicrobial agent-containing layers in tempered SLG articles that exhibit high antimicrobial efficacy. Advantageously, these heat treated antimicrobial SLG articles also exhibit low discoloration levels or are colorless (see FIG. 9, sample group B3).

Figure 12:
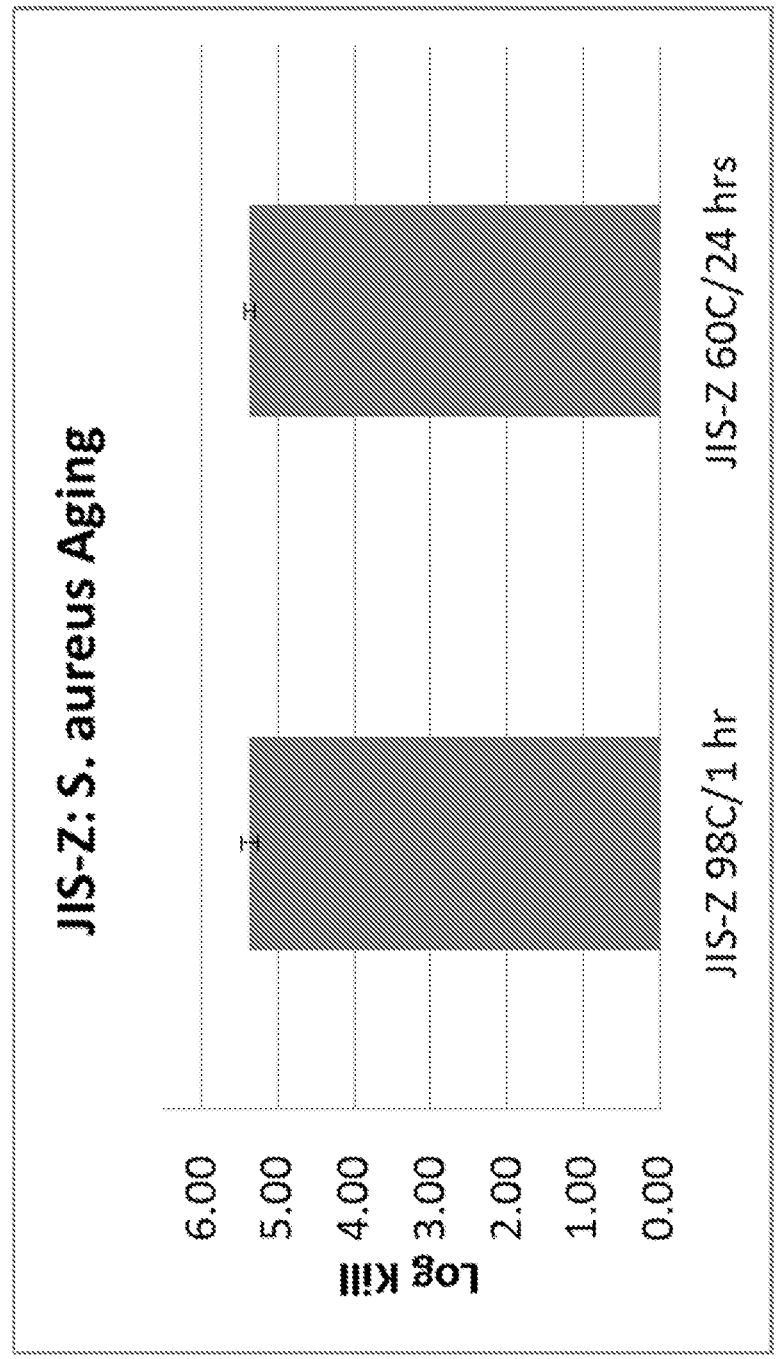
FIG. 12 is a bar chart depicting antimicrobial efficacy according to the JIS Z 2801 (2000) test with *S. Aureus* bacteria after being immersed in water having a temperature of 98° C. for 1 hour and after a sample was exposed to an environment of 60° C. and 85% relative humidity for 24 hours, for heat-treated SLG articles subjected to a one-step ion exchange process according to an aspect of the disclosure.

FIG. 12 shows a bar chart depicting antimicrobial efficacy according to the JIS Z 2801 (2000) test with *S. Aureus* bacteria, after a sample was immersed in water having a temperature of 98° C. for 1 hour and after a sample was exposed to an environment of 60° C. and 85% relative humidity for 24 hours. In FIG. 12, each sample included the tempered antimicrobial SLG article of B3, shown in FIG. 9 and each sample demonstrated log kill values of about 5 or greater after both aging conditions The results in FIG. 12 make clear that the antimicrobial efficacy can be maintained after aging conditions.

Samples of B3 and C were subjected to ring-on-ring testing to determine average flexural strength. The results of the ring-on-ring testing are shown in Table 1. As shown in Table 1, B3 exhibited an average flexural strength that is about 23% greater than C, suggesting the surface compressive stress increased even when a one-step ion exchange process using an antimicrobial bath of 0.5 wt % $AgNO_3$ and a eutectic mixture (50:50) of $KNO_3$ and $NaNO_3$ is utilized to form the tempered antimicrobial SLG article. The antimicrobial bath had a temperature of 250° C. and the glass was immersed into the bath for about 30 minutes.

TABLE 1

Average flexural strength of B3 and C

| | ROR failure load (kgf) |
|---|---|
| C | 844 |
| B3 | 1040 |

The CIE 1976 color coordinates L*, a*, and b*, the silver concentration in wt % (measured by inductively coupled plasma mass spectrometry (ICP-MS)), surface Ag2O concentration in wt % (measured by SIMS) and depth of $Ag_2O$ in micrometers (measured by SIMS) of C, B1, B2 and B3 were measured. The results are shown in Table 2.

TABLE 2

Color and silver concentration and depth information for B1, B23 and B3.

| IOX condition | L | a* | b* | Ag by ICP, wt % | Surface $Ag_2O$ by SIMS, wt % | Depth of $Ag_2O$ by SIMS, μm |
|---|---|---|---|---|---|---|
| As-is SLG | 95.82 | −0.65 | 0.27 | 0 | 0 | 0 |
| B1 (0.1% $AgNO_3$, 300° C./30 minutes) | 95.73 | −0.61 | 0.50 | 0.006 | 6 | 2.1 |
| B2 (0.3% $AgNO_3$, 250° C./45 minutes) | 95.71 | −0.61 | 0.43 | 0.011 | 14 | 1.4 |
| B3 (0.5% $AgNO_3$, 250° C./30 minutes) | 95.57 | −0.62 | 0.58 | 0.016 | 27 | 1.4 |

Figure 13:
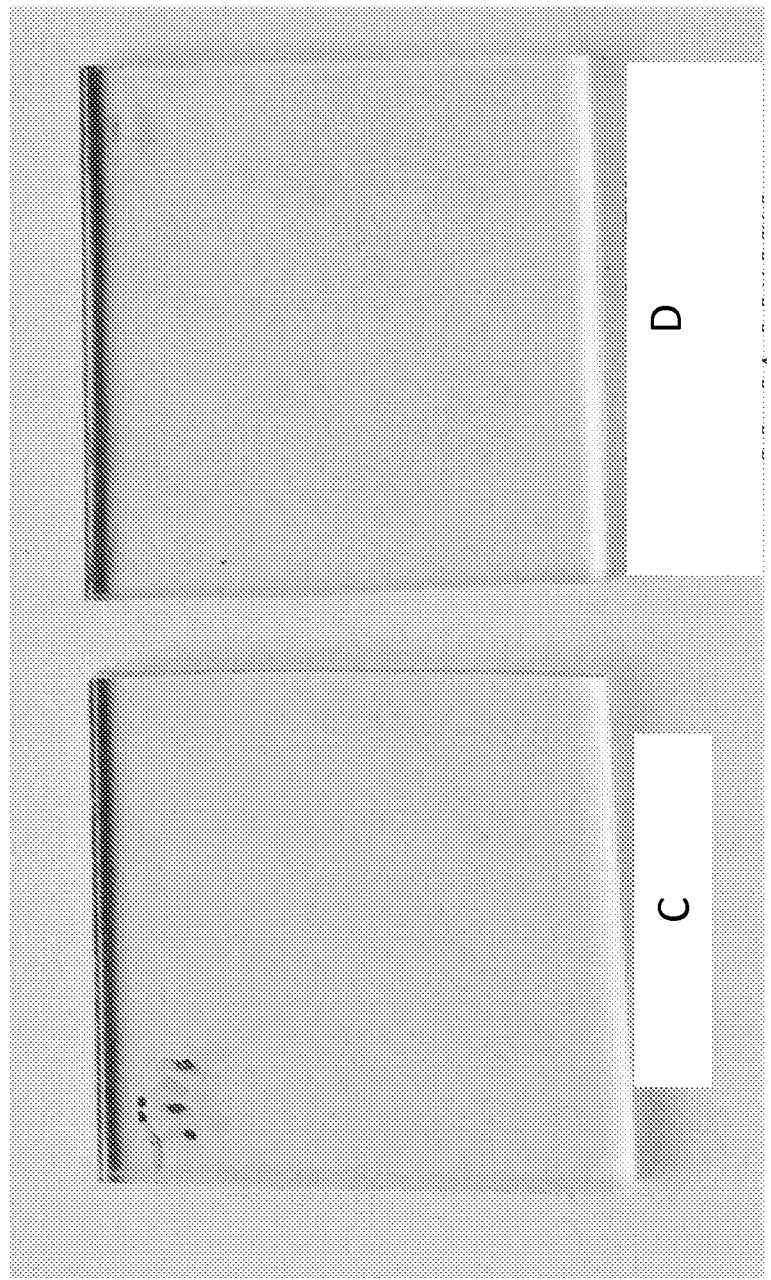
FIG. 13 shows images of heat-treated SLG articles subjected to a one-step ion exchange process according to an aspect of the disclosure and heat treated SLG articles that were not subjected to a one-step ion exchange process.

FIG. 13 shows images of a tempered SLG article (e.g., SLG articles 10) that have not been subjected to any ion exchange processes for developing compressive stress and antimicrobial agent-containing layers (denoted by C), and tempered SLG articles formed using a one-step ion exchange process including an antimicrobial bath of an aqueous solution including 8.65 mols Ag/liter (denoted by D). D was formed by immersing a SLG substrate in the saturated aqueous solution at room temperature having a temperature of 95° C. for 96 hours. In both C and D, there was no material removal (i.e., both C and D included a primary surface comprising tin). As shown in FIG. 13, similar optical clarity was observed for C (which experienced no ion exchange process) and D (which was subjected to an ion exchange process in an aqueous solution including $AgNO_3$). Table 3 shows the measured CIE 1976 color coordinates L*, a*, and b* for C and D. Color shift was determined by the equation: $\sqrt{(L^*_C-L^*_D)^2+(a^*_C-a^*_D)^2+(b^*_C-b^*_D)^2}$.

TABLE 3

CIE 1976 color coordinates L*, a*, and b* for C and D.

| | L* | a* | b* | Delta (change between C and D) L* | a* | b* | Color shift |
|---|---|---|---|---|---|---|---|
| C | 94.55 | −1.27 | 2.69 | — | — | — | — |
| D | 94.49 | −1.27 | 2.76 | −0.06 | 0 | 0.07 | 0.09 |

Figure 14:
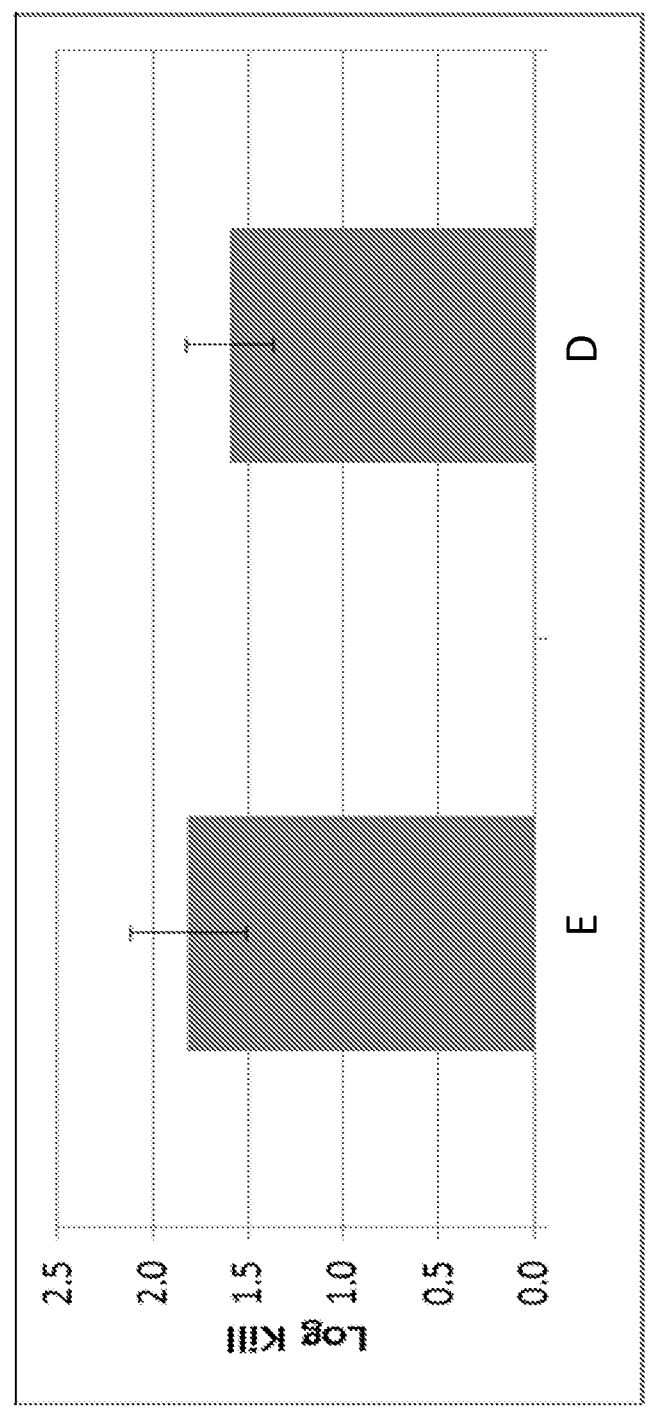
FIG. 14 is a bar chart depicting antimicrobial efficacy according to the Dry Test for SLG articles subjected to a one-step ion exchange process according to an aspect of the disclosure.

FIG. 14 shows a bar chart of the antimicrobial efficacy according to the Dry Test for D of FIG. 13 and a heated antimicrobial SLG article formed by a one-step process in which a tempered SLG substrate is immersed in a molten salt bath of 5 wt % $AgNO_3$ and 95 wt % $KNO_3$ having a temperature of 350° C. for 15 minutes (denoted E). D and E were not subjected to any material removal step and exhibited log kill values of greater than 1.5.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. An antimicrobial glass article, comprising:
   a heat-treated glass substrate having a substrate thickness, a primary surface, and a soda lime glass composition;
   a compressive stress layer that extends from the primary surface to a first depth that is greater than or equal to 0.15 times the substrate thickness; and
   an antimicrobial agent-containing layer having an antimicrobial agent comprising silver ions that extends from the primary surface to a second depth of less than 15 μm,
   wherein the article comprises a concentration of about 1 weight percent or greater silver ions at the primary surface, and
   wherein the article exhibits an absorbance of about 0.10 or less at a wavelength of 450-550 nm.

2. The article of claim 1, wherein the first depth is between about 25 microns and 1000 microns and an average compressive stress in the compressive stress layer is at least about 100 MPa.

3. The article of claim 1, further comprising a second compressive stress layer that extends from the primary surface to a third depth in the substrate, wherein the article comprises an average compressive stress of about 200 MPa or greater, and wherein the third depth is equal to or less than the second depth.

4. The article of claim 1, further comprising an amount of potassium, sodium and antimicrobial agent within a thickness of the substrate of about 2 micrometers from the primary surface, wherein potassium comprises less than about 75% of the amount of potassium, sodium and the antimicrobial agent, wherein the antimicrobial agent comprises about 0.5% or more of the amount of potassium, sodium and antimicrobial agent within the thickness of about 2 micrometers, wherein the second depth of the antimicrobial agent is about 5 micrometers or less, and wherein the article comprises an antimicrobial agent concentration of between 2 and 40 weight percent silver ions at the primary surface.

5. The article of claim 1, wherein the primary surface exhibits a log kill of 3 or greater in a concentration of any one or more of S. aureus, E. aerogenes, E. Coli, and P. auriginosa under JIS Z 2801 (2000) testing conditions, modified JIS Z 2801 (2000) testing conditions, or Dry Test testing conditions, and wherein the log kill is maintained after any one of the article is boiled in water having a temperature of about 98° C. or greater for about 1 hour, the article is exposed to an environment having a temperature of about 60° C. and 85% relative humidity for 24 hours, the article is cooled to a temperature of about 1° C. or greater.

6. The article of claim 1, wherein the article exhibits a CIE 1976 color coordinate b* of less than about 2.

7. The article of claim 1, wherein the primary surface is substantially free of tin.

8. The article of claim 1, wherein the primary surface comprises tin.

9. A device comprising the antimicrobial glass article of claim 1.

10. A method of making an antimicrobial glass article, comprising the steps:
   providing a heat-treated glass substrate having a substrate thickness, a primary surface, a soda lime glass composition and a compressive stress layer that extends from the primary surface to a first depth that is greater than or equal to 0.15 times the substrate thickness; and
   forming an antimicrobial agent-containing layer having an antimicrobial agent that extends from the primary surface to a second depth of less than 15 μm in the substrate, the antimicrobial agent comprising a silver ion concentration of about 1 weight percent of greater at the primary surface,
wherein the antimicrobial glass article exhibits an absorbance of about 0.10 or less at a wavelength of 450-550 nm.

11. The article of claim 1, wherein the article exhibits a CIE 1976 color coordinate b* of less than 0.5.

12. The article of claim 11, wherein the primary surface exhibits a log kill of 6 or greater in a concentration of *S. aureus* under JIS Z 2801 (2000) testing conditions.

13. The article of claim 1, wherein the primary surface exhibits a log kill of 6 or greater in a concentration of *S. aureus* under JIS Z 2801 (2000) testing conditions.

14. The article of claim 1,
wherein the primary surface exhibits a log kill of 5 or greater in a concentration of *E. Coli* and *S. Aureus* under JIS Z 2801 (2000) testing conditions; and
wherein the article exhibits a CIE 1976 color coordinate b* of less than about 0.6.

15. The article of claim 14, wherein the article exhibits an average flexural strength, as measured by ring-on-ring testing, of about 700 kgf or greater.

16. The article of claim 1, wherein the substrate thickness is less than 7 mm.

17. The article of claim 1, wherein the article comprises a concentration of about 6 weight percent to about 27 weight percent silver ions at the primary surface.

18. The article of claim 17, wherein the second depth is 2.1 μm or less.

19. The article of claim 18, wherein the primary surface exhibits a log kill of 5 or greater in a concentration of *E. Coli* and *S. Aureus* under JIS Z 2801 (2000) testing conditions; and
wherein the article exhibits a CIE 1976 color coordinate b* of less than about 0.6.

20. An antimicrobial glass article manufactured by the method of claim 10.

21. The method of claim 10, further comprising forming a second compressive stress layer that extends from the primary surface to a third depth in the substrate.

22. The method of claim 21 or 10, wherein the antimicrobial article comprises a compressive stress of about 200 MPa or greater.

23. The method of claim 21, wherein forming a second compressive stress layer comprises ion-exchanging a plurality of alkali ions into the primary surface, wherein the plurality of alkali ions comprises any one or more of sodium and potassium.

24. The method of claim 10, further comprising the step:
removing a portion of the primary surface to obtain a processed primary surface, wherein the removing step is conducted before forming the antimicrobial agent-containing layer, wherein the portion of the primary surface removed in the removing step is 2 to 20 microns of the substrate.

25. The method of claim 24, wherein the primary surface comprises tin and removing the portion of the primary surface to obtain the processed primary surface removes the tin.

26. The method of claim 10, wherein forming the antimicrobial agent-containing layer comprises immersing the substrate into a molten bath comprising $AgNO_3$ and an eutectic salt mixture of $KNO_3$ and $NaNO_3$, wherein the molten bath has a temperature of 300° C. or less, and wherein the molten bath comprises about 0.01 weight percent to about 1 weight percent $AgNO_3$.

27. The method of claim 10, wherein forming the antimicrobial agent-containing layer comprises immersing the substrate into an aqueous solution comprising an antimicrobial agent precursor, wherein the aqueous solution comprises $AgNO_3$ and a temperature of about 250° C. or less, and wherein the aqueous solution comprises about 0.01 weight percent to about 50 weight percent $AgNO_3$.

28. The method of claim 10 further comprising:
heat-treating a glass substrate having the substrate thickness, the primary surface, and the soda lime glass composition thereby providing the heat-treated glass substrate with the compressive stress layer that extends from the primary surface to the first depth that is greater than or equal to 0.15 times the substrate thickness, wherein the primary surface comprises tin; and
before forming the antimicrobial agent-containing layer, removing a portion of the primary surface to provide a processed primary surface that has less tin than the primary surface.

29. The method of claim 28, wherein heat-treating the glass substrate comprises either (a) annealing the glass substrate at about 550° C. and then furnace cooling the glass substrate to ambient temperature or (b) tempering the glass substrate at about 700° C. and then rapidly cooling the glass substrate with high velocity or pressure air.

30. The method of claim 10 wherein the glass substrate comprises at least one surface including an ink layer, and wherein forming the antimicrobial agent-containing layer does not remove the ink layer from the at least one surface.

* * * * *

UNITED STATES PATENT AND TRADEMARK OFFICE
CERTIFICATE OF CORRECTION

PATENT NO. : 10,723,652 B2  
APPLICATION NO. : 15/324173  
DATED : July 28, 2020  
INVENTOR(S) : Hongmei Hu et al.

Page 1 of 1

It is certified that error appears in the above-identified patent and that said Letters Patent is hereby corrected as shown below:

On the Title Page

On page 2, in Column 2, item (56), Other Publications, Line 18, delete "Linnnaeus" and insert -- Linnaeus --, therefor.

In the Claims

In Column 30, Line 43, Claim 5, delete "auriginosa" and insert -- aeruginosa --, therefor.

Signed and Sealed this
Twenty-ninth Day of September, 2020

Andrei Iancu
*Director of the United States Patent and Trademark Office*